US010136360B2

(12) United States Patent
Paredes Cabrera et al.

(10) Patent No.: US 10,136,360 B2
(45) Date of Patent: Nov. 20, 2018

(54) DIRECT RATE ADAPTATION FOR AN END-TO-END COMMUNICATION PATH BY A CELLULAR NETWORK NODE

(71) Applicant: Telefonaktiebolaget LM Ericsson (publ), Stockholm (SE)

(72) Inventors: Ricardo Paredes Cabrera, Ottawa (CA); Vijayashree Sundaram, Ottawa (CA); Jianning Liu, Ottawa (CA); Eric W. Parsons, Stittsville (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 29 days.

(21) Appl. No.: 15/320,414

(22) PCT Filed: Jun. 30, 2014

(86) PCT No.: PCT/IB2014/062741
§ 371 (c)(1),
(2) Date: Dec. 20, 2016

(87) PCT Pub. No.: WO2016/001715
PCT Pub. Date: Jan. 7, 2016

(65) Prior Publication Data
US 2017/0164238 A1    Jun. 8, 2017

(51) Int. Cl.
*H04W 4/00* (2018.01)
*H04W 28/12* (2009.01)
(Continued)

(52) U.S. Cl.
CPC ............. *H04W 28/12* (2013.01); *H04L 69/22* (2013.01); *H04W 28/22* (2013.01);
(Continued)

(58) Field of Classification Search
CPC combination set(s) only.
See application file for complete search history.

(56) References Cited

U.S. PATENT DOCUMENTS 9,584,416 B2\* 2/2017 Ho .......................... H04L 47/10
2009/0168793 A1\* 7/2009 Fox ..................... H04L 12/5693
370/412
(Continued)

FOREIGN PATENT DOCUMENTS

WO       2009024501 A1      2/2009
WO    WO-2009024501 A1  \*  2/2009  ............. H04L 47/14
WO       2011053222 A1      5/2011

OTHER PUBLICATIONS

3GPP (TS 36.331 V12.1.0 (Mar. 2014), release 12, Technical specification group radio access nettwork ). (Year: 2014).\*
(Continued)

*Primary Examiner* — Maharishi V Khirodhar
(74) *Attorney, Agent, or Firm* — Patent Portfolio Builders, PLLC

(57) ABSTRACT

Systems and methods relating to direct bit rate adaptation for end-to-end communication via a cellular communications network are disclosed. In one embodiment, a method of operation of a radio access node in a cellular communications network includes obtaining a bit rate associated with a radio bearer between the radio access node and a wireless device. The radio bearer between the radio access node and the wireless device is part of an end-to-end communication path between the wireless device, as a first end-point of the end-to-end communication path, and a second end-point. The method further includes transmitting the bit rate associated with the radio bearer to the wireless device. By transmitting the bit rate associated with the radio bearer to the wireless device, the radio access node controls a bit rate for the end-to-end communication path between the wireless device and the second end-point.

21 Claims, 28 Drawing Sheets

(51) Int. Cl.
  *H04W 28/22*  (2009.01)
  *H04L 29/06*  (2006.01)
  *H04W 72/04*  (2009.01)
  *H04W 72/10*  (2009.01)
  *H04W 88/08*  (2009.01)
(52) U.S. Cl.
  CPC ......... *H04W 72/042* (2013.01); *H04W 72/10* (2013.01); *H04W 88/08* (2013.01)

(56) References Cited

U.S. PATENT DOCUMENTS

2011/0305240 A1   12/2011   Chu et al.
2012/0033606 A1*  2/2012    Chun ................ H04B 7/15528
                                                              370/315

OTHER PUBLICATIONS

Author Unknown, "Technical Specification Group Services and System Aspects; General Packet Radio Service (GPRS) enhancements for Evolved Universal Terrestrial Radio Access Network (E-UTRAN) access (Release 12)," Technical Specification 23.401, Version 12.5.0, 3GPP Organizational Partners, Jun. 2014, 305 pages.
Author Unknown, "Technical Specification Group Radio Access Network; Evolved Universal Terrestrial Radio Access (E-UTRA); Medium Access Control (MAC) protocol specification (Release 12)," Technical Specification 36.321, Version 12.1.0, 3GPP Organizational Partners, Mar. 2014, 57 pages.
Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.5.0, 3GPP Organizational Partners, Sep. 2013, 347 pages.
Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.0.0, 3GPP Organizational Partners, Dec. 2013, 349 pages.
Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.1.0, 3GPP Organizational Partners, Mar. 2014, 356 pages.
Author Unknown, "Technical Specification Group Radio Access Network; Evolved Universal Terrestrial Radio Access Network (E-UTRAN); S1 Application Protocol (S1AP) (Release 12)," Technical Specification 36.413, Version 12.1.0, 3GPP Organizational Partners, Mar. 2014, 285 pages.
International Search Report and Written Opinion for International Patent Application No. PCT/IB2014/062741, dated Mar. 17, 2015, 12 pages.

* cited by examiner

| INDEX | LCID VALUES |
|---|---|
| 00000 | CCCH |
| 00001–01010 | IDENTITY OF THE LOGICAL CHANNEL |
| 01011–10111 | RESERVED |
| 11000 | BIT RATE ADAPTATION 1 |
| 11001 | BIT RATE ADAPTATION 2 |
| 11010 | POWER HEADROOM REPORT |
| 11011 | C-RNTI |
| 11100 | TRUNCATED BSR |
| 11101 | SHORT BSR |
| 11110 | LONG BSR |
| 11111 | PADDING |

FIG. 4

```
DownlinkBearerConfig ::= SEQUENCE { dl-SpecificParameters SEQUENCE { prioritisedBitRate ENUMERATED {

Kbps0, Kbps8, Kbps16, Kbps32, Kbps64, Kbps128, Kbps256, Kbps512, Kbps1024, Kbps2048,
    Kbps4096, Kbps8192, Kbps16384, Kbps32768, Kbps65536, INFINITY, SPARE5, SPARE4,
    SPARE3, SPARE2, SPARE1},

...,

}

DRB-ToAddMod ::= SEQUENCE { eps-BearerIdentity INTEGER (0.. 15) OPTIONAL, - - Cond DRB-Setup drb-Identity DRB-Identity, pdcp-Config PDCP-Config OPTIONAL, - - Cond PDCP rlc-Config RLC-Config OPTIONAL, - - Cond Setup logicalChannelIdentity INTEGER (3..10) OPTIONAL, - - Cond DRB-Setup logicalChannelConfig LogicalChannelConfig OPTIONAL, - - Cond Setup DownlinkBearerConfig OPTIONAL, - - Cond Setup

DIRECT RATE ADAPTATION FOR AN END-TO-END COMMUNICATION PATH BY A CELLULAR NETWORK NODE

This application is a 35 U.S.C. § 371 national phase filing of International Application No. PCT/IB2014/062741, filed Jun. 30, 2014, the disclosure of which is incorporated herein by reference in its entirety.

FIELD OF THE DISCLOSURE

The present disclosure relates to rate adaptation for an end-to-end communication path passing through a cellular communications network.

BACKGROUND

Currently, rate adaptation in $3^{rd}$ Generation Partnership Project (3GPP) Long Term Evolution (LTE) networks is handled by the transport layer combined with the Internet Protocol (IP) layer. Specifically, many LTE networks use layer 3 mechanisms such as Explicit Congestion Notification (ECN). More specifically, an ECN based rate adaptation process for adapting a data rate between a Transmit (TX) source 10 and a User Equipment device (UE) 12 connected to an enhanced Node B (eNB) 14 of a LTE network is illustrated in FIG. 1. As illustrated, the TX source 10, which may be a device that is external to the LTE network (e.g., a web server) or another device connected to the LTE network (e.g., another UE), transmits packet(s) destined for the UE 12 to a Packet Data Network (PDN) 16 (step 100). The packet(s) pass through the PDN 16 to a PDN Gateway (P-GW) 18 in a core network of the LTE network (step 102). From the P-GW 18, the packet(s) pass to a Serving Gateway (S-GW) 20 in the core network and then on to the eNB 14 (steps 104 and 106). In this example, the eNB 14 detects congestion and, in order to signal congestion to the UE 12 (i.e., the receiving end-point), the eNB 14 sets an ECN bit in the IP header(s) of the packet(s) (step 108). The packet(s) are then transmitted from the eNB 14 to the UE 12 (step 110).

At the UE 12, the UE 12 detects the ECN bit in at least one of the TX packet(s) (step 112). In response, the congestion is reported to an upper layer(s) (e.g., layer 4) at the UE 12 (step 114). The upper layer(s) then send a congestion notification to the TX source 10, where the congestion notification propagates back through the eNB 14, the S-GW 20, the P-GW 18, the PDN 16, and then to the TX source 10 (steps 116-124). In response to the congestion notification, an upper layer(s) at the TX source 10 selects a new, lower, bit rate for transmitting packets to the UE 12 (step 126). For example, the Transmission Control Protocol (TCP) layer may use the congestion notification to adjust its windows, the Real-Time Transport Protocol (RTP) layer may use the congestion notification to adjust its bit rate, etc. The TX source 10 then continues transmitting packet(s) to the UE 12, but at the new bit rate (step 128). These packet(s) then pass through the PDN 16, the P-GW 18, the S-GW 20, and the eNB 14, then arrive at the UE 12 (steps 130-136).

However, ECN is very limited. In particular, ECN does not allow the LTE network nodes (e.g., the P-GW 18, the S-GW 20, and/or the eNB 14) to have any control over the selection of the new bit rate for communication between the transmitting end-point (which in FIG. 1 is the TX source 10) and the receiving end-point (which in FIG. 1 is the UE 12). Thus, if, for example, there is congestion in the cell served by the eNB 14, the eNB 14 can set the ECN bit to indicate congestion, but it is the TX source 10 that selects the new bit rate. The eNB 14 has no control over what new bit rate is selected.

As such, there is a need for systems and methods that enable LTE network nodes to provide rate adaptation and, in particular, to provide direct selection of the bit rate for communication between two end-points via the LTE network.

SUMMARY

Systems and methods relating to direct bit rate adaptation for end-to-end communication via a cellular communications network are disclosed. In one embodiment, a method of operation of a radio access node in a cellular communications network is provided. In one embodiment, the method of operation of the radio access node includes obtaining a bit rate associated with a radio bearer between the radio access node and a wireless device. The radio bearer between the radio access node and the wireless device is part of an end-to-end communication path between the wireless device, as a first end-point of the end-to-end communication path, and a second end-point. In one embodiment, the radio bearer is a downlink radio bearer, and the bit rate associated with the downlink radio bearer is either a bit rate for the downlink radio bearer or an aggregate bit rate for all downlink radio bearers for the wireless device. In another embodiment, the radio bearer is an uplink logical channel, or uplink radio bearer, and the bit rate associated with the uplink logical channel is a bit rate for the uplink logical channel or an aggregate bit rate for all uplink logical channels for the wireless device. The method of operation of the radio access node further includes transmitting the bit rate associated with the radio bearer to the wireless device. By transmitting the bit rate associated with the radio bearer to the wireless device, the radio access node controls a bit rate for the end-to-end communication path between the wireless device and the second end-point. In this manner, the radio access node provides direct bit rate adaption for the radio bearer, and thus the end-to-end communication path. This may be particularly beneficial to enable the radio access node to control the bit rate for the end-to-end path in response to, e.g., congestion in the cellular communications network.

In one embodiment, transmitting the bit rate associated with the radio bearer includes transmitting a Medium Access Control (MAC) Control Element (CE) to the wireless device, where the MAC CE contains the bit rate for the radio bearer. In another embodiment, transmitting the bit rate for the radio bearer includes transmitting a MAC frame to the wireless device such that the MAC frame includes a MAC sub-header including a Logical Channel Identifier (LCID) that indicates that a corresponding MAC CE in the MAC frame contains bit rate adaptation information, and the corresponding MAC CE in the MAC frame includes a value indicative of the bit rate associated with the radio bearer between the radio access node and the wireless device. In one embodiment, the LCID is an unused LCID as defined by a corresponding communications standard.

In another embodiment, transmitting the bit rate associated with the radio bearer to the wireless device includes transmitting the bit rate associated with the radio bearer to the wireless device via Radio Resource Control (RRC) signaling. In one embodiment, transmitting the bit rate associated with the radio bearer to the wireless device via RRC signaling includes transmitting an RRC Connection Reconfiguration message including an Information Element (IE) that includes the bit rate.

In one embodiment, the radio bearer is an uplink logical channel, the bit rate is a bit rate for the logical channel, the IE is a LogicalChannelConfig IE including one or more parameters, and transmitting the RRC Connection Reconfiguration message includes transmitting the bit rate for the logical channel using the one or more parameters in the LogicalChannelConfig IE. The parameters may include Logical Channel Group (LCG), Priority, or Prioritized Bit Rate (PBR). In another embodiment, the radio bearer is a downlink radio bearer, the bit rate is a bit rate for the downlink radio bearer, the IE is an IE for downlink bit rate adaptation, and transmitting the RRC Connection Reconfiguration message includes transmitting the bit rate for the downlink radio bearer in the IE for downlink bit rate adaptation.

In one embodiment, the cellular communications network is a Long Term Evolution (LTE) network. Further, in one embodiment, the radio access node is an enhanced Node B (eNB) in the LTE network.

In one embodiment, a radio access node for a cellular communications network is provided. In one embodiment, the radio access node includes a wireless transceiver, a processor, and memory containing software executable by the processor whereby the radio access node is operative to obtain a bit rate associated with a radio bearer between the radio access node and a wireless device and transmit, via the wireless transceiver, the bit rate associated with the radio bearer to the wireless device. The radio bearer between the radio access node and the wireless device is part of an end-to-end communication path between the wireless device, as a first end-point for the end-to-end communication path, and a second end-point for the end-to-end communication path. By transmitting the bit rate associated with the radio bearer to the wireless device, the radio access node controls a bit rate for the end-to-end communication path between the wireless device and the second end-point. In this manner, the radio access node provides direct bit rate adaption for the radio bearer, and thus the end-to-end communication path. This may be particularly beneficial to enable the radio access node to control the bit rate for the end-to-end path in response to, e.g., congestion in the cellular communications network.

In one embodiment, a method of operation of a wireless device (e.g., a User Equipment device (UE)) is provided. In one embodiment, the method of operation of the wireless device includes receiving, from a radio access node of the cellular communications network, a bit rate associated with a radio bearer between the radio access node and the wireless device. The radio bearer between the radio access node and the wireless device is part of an end-to-end communication path between the wireless device, as a first end-point for the end-to-end communication path, and a second end-point for the end-to-end communication path. The method further includes operating according to the bit rate. In one embodiment, the radio bearer is a downlink radio bearer, and operating according to the bit rate includes receiving the downlink radio bearer according to the associated bit rate. In another embodiment, the radio bearer is an uplink logical channel, or uplink radio bearer, and operating according to the bit rate includes transmitting the uplink logical channel according to the associated bit rate.

In one embodiment, receiving the bit rate for the radio bearer includes receiving a MAC CE from the radio access node containing the bit rate associated with the radio bearer. In another embodiment, receiving the bit rate for the radio bearer includes receiving a MAC frame from the radio access node, wherein the MAC frame includes a MAC sub-header including an LCID that indicates that a corresponding MAC CE contains bit rate adaptation information, and the corresponding MAC CE includes a value indicative of the bit rate associated with the radio bearer between the radio access node and the wireless device. In one embodiment, the LCID is an unused LCID as defined by a corresponding communications standard. In one embodiment, the cellular communications network is an LTE network.

In one embodiment, receiving the bit rate associated with the radio bearer from the radio access node includes receiving the bit rate associated with the radio bearer from the radio access node via Radio Resource Control, RRC, signaling. In one embodiment, receiving the bit rate associated with the radio bearer from the radio access node via RRC signaling includes receiving an RRC Connection Reconfiguration message including an IE that includes the bit rate.

In one embodiment, the radio bearer is an uplink logical channel, the bit rate is a bit rate for the logical channel, the IE is a LogicalChannelConfig IE including one or more parameters, and receiving the RRC Connection Reconfiguration message includes receiving the bit rate for the logical channel using the one or more parameters in the LogicalChannelConfig IE. The parameters may include LCG or Priority, Prioritized Bit Rate (PBR). In another embodiment, the radio bearer is a downlink radio bearer, the bit rate is a bit rate for the downlink radio bearer, the IE is an IE for downlink bit rate adaptation, and receiving the RRC Connection Reconfiguration message includes receiving the bit rate for the downlink radio bearer in the IE for downlink bit rate adaptation.

In one embodiment, a wireless device configured to operate in a cellular communications network is provided. In one embodiment, the wireless device includes a wireless transceiver, a processor, and memory containing software executable by the processor whereby the wireless device is operative to receive, from a radio access node of the cellular communications network via the wireless transceiver, a bit rate associated with a radio bearer between the radio access node and the wireless device, and operate according to the bit rate. The radio bearer between the radio access node and the wireless device is part of an end-to-end communication path between the wireless device, as a first end-point for the end-to-end communication path, and a second end-point for the end-to-end communication path.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 4 is a table illustrating a number of used and unused Logical Channel Identifiers (LCIDs) as defined by $3^{rd}$ Generation Partnership Project (3GPP) Technical Specification (TS) 36.321 V12.1.0 but with the additional definition of up to two of the previously unused LCIDs as LCIDs indicative of bit rate adaptation;

Figure 5:
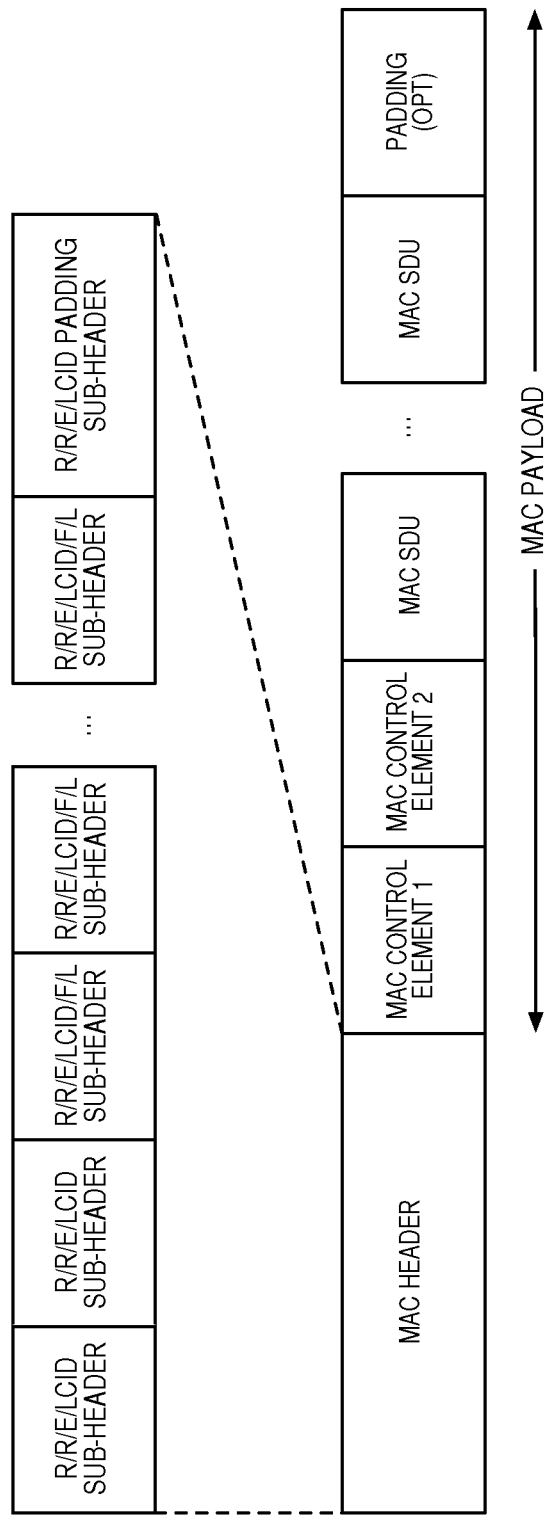
Figure 6:
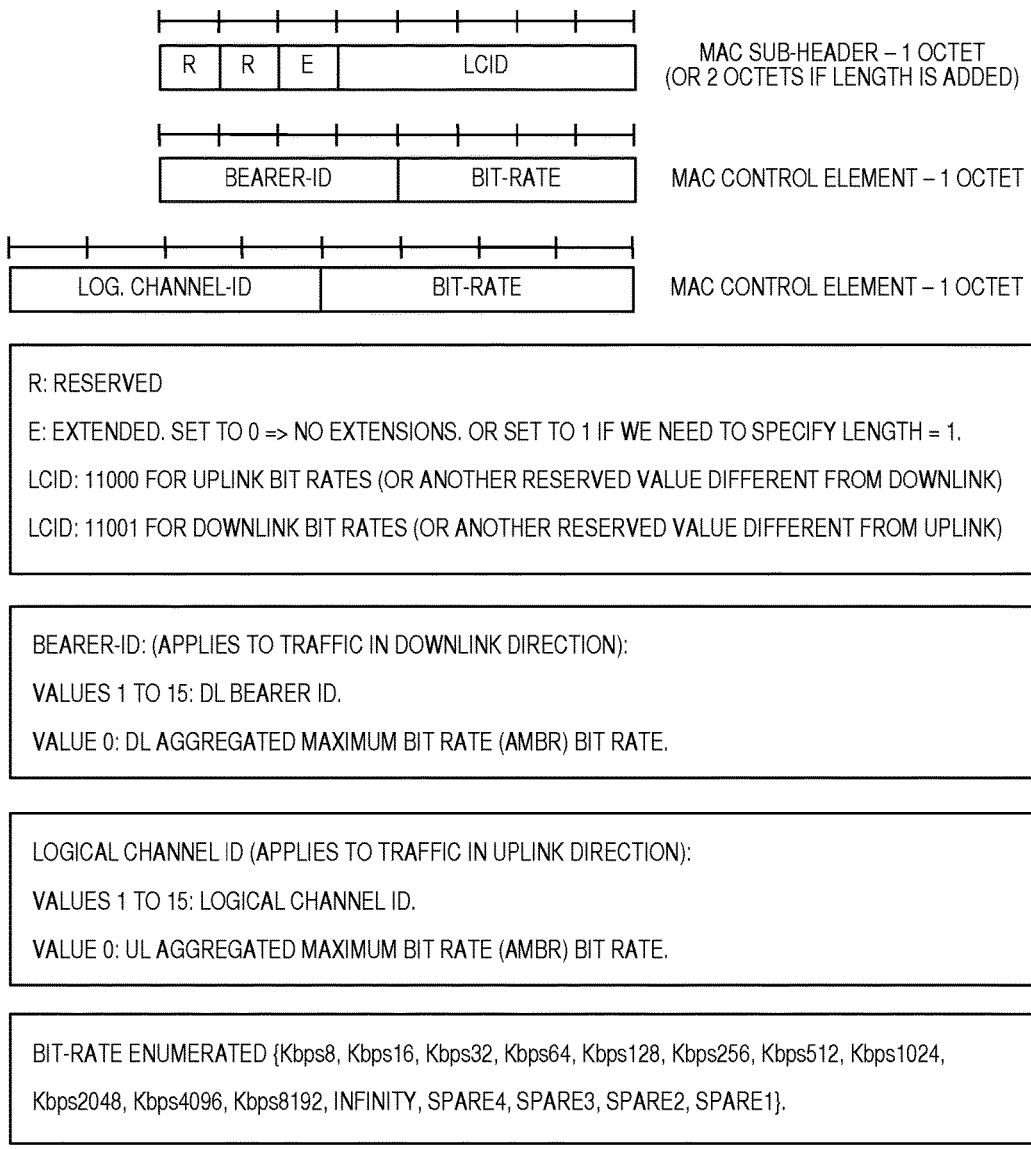
Figure 7:
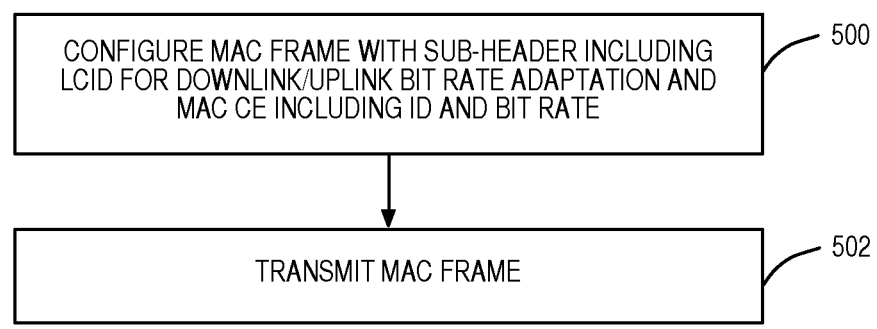
Figure 8A:
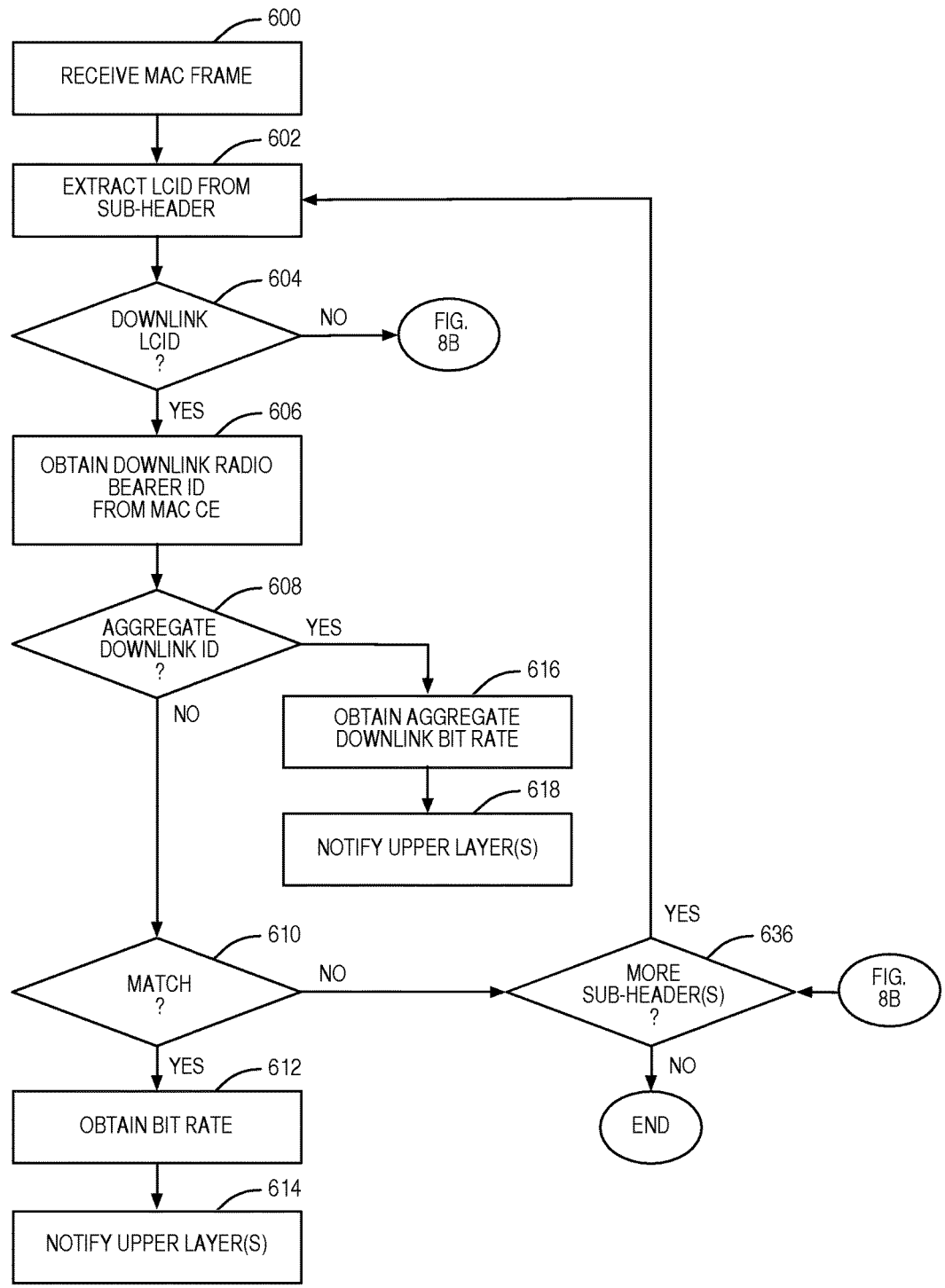
Figure 8B:
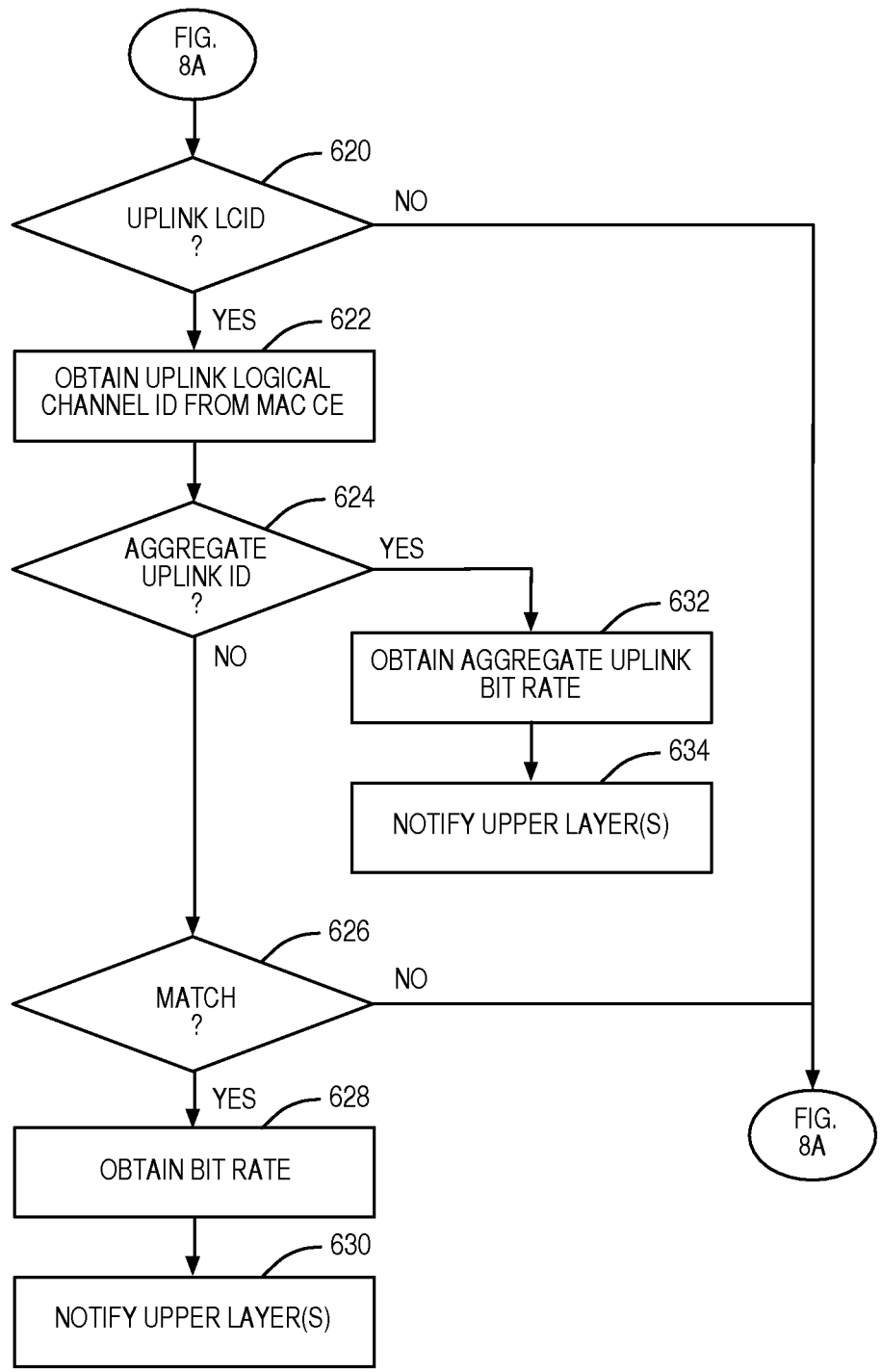
Figure 9:
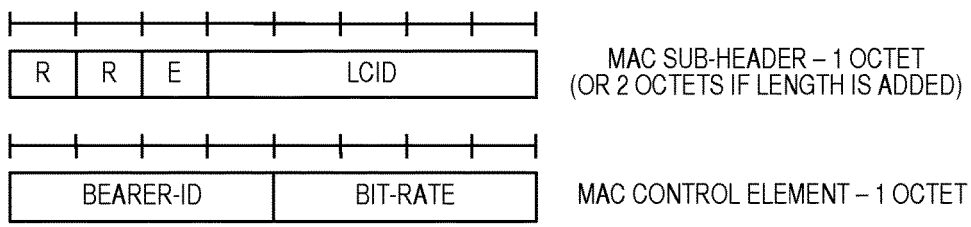
Figure 10:
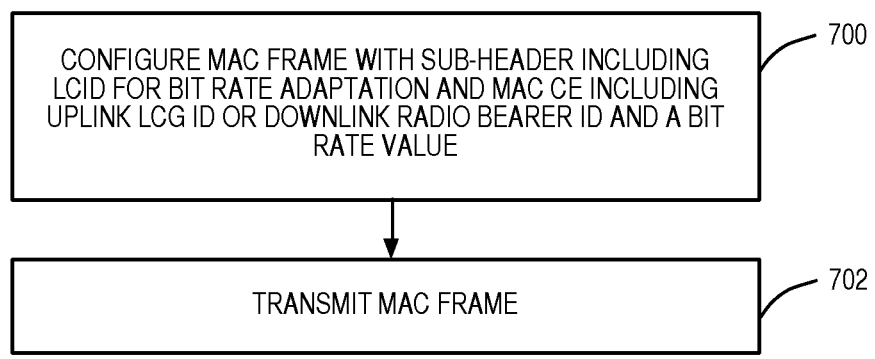
Figure 11A:
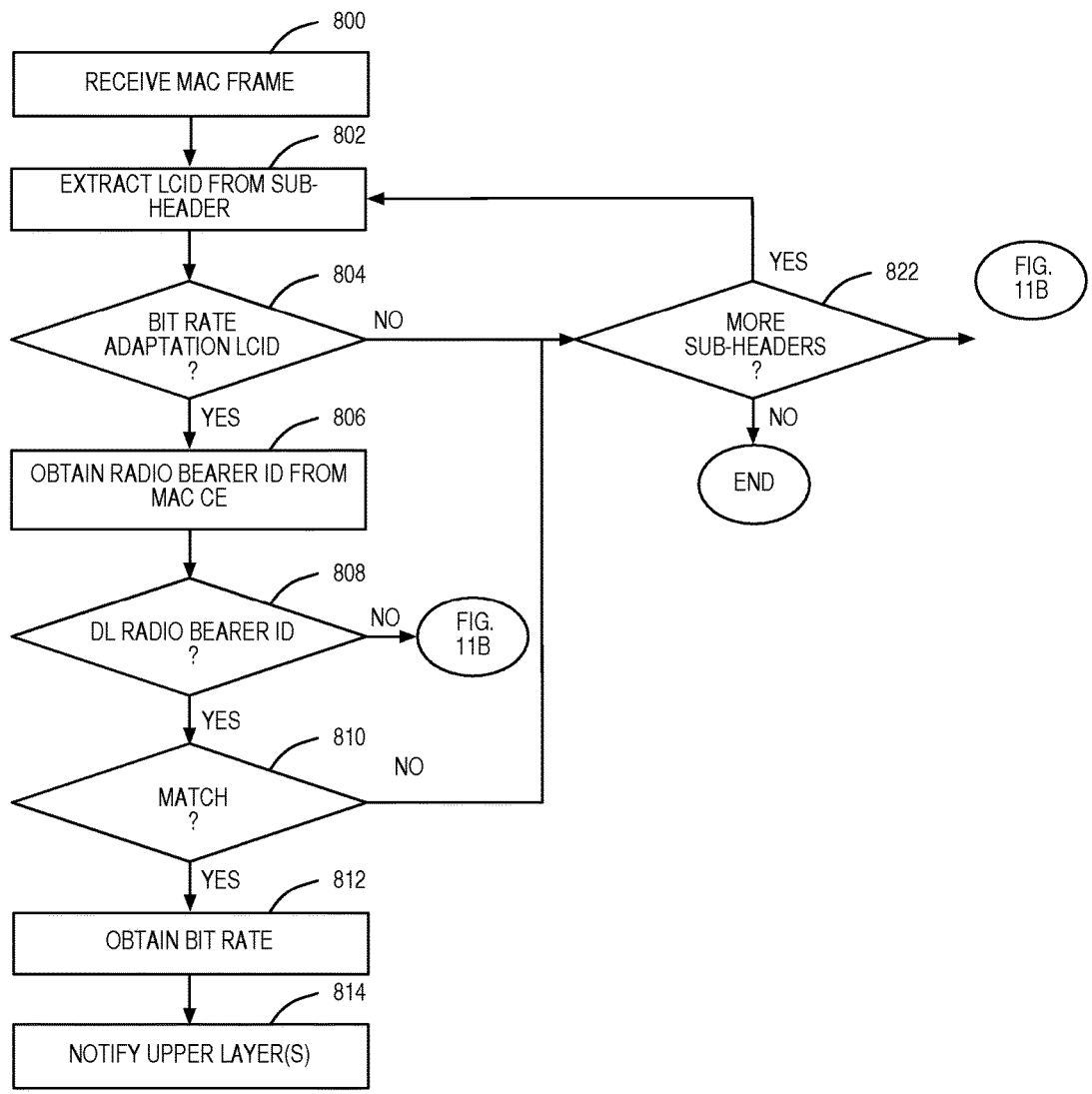
Figure 11B:
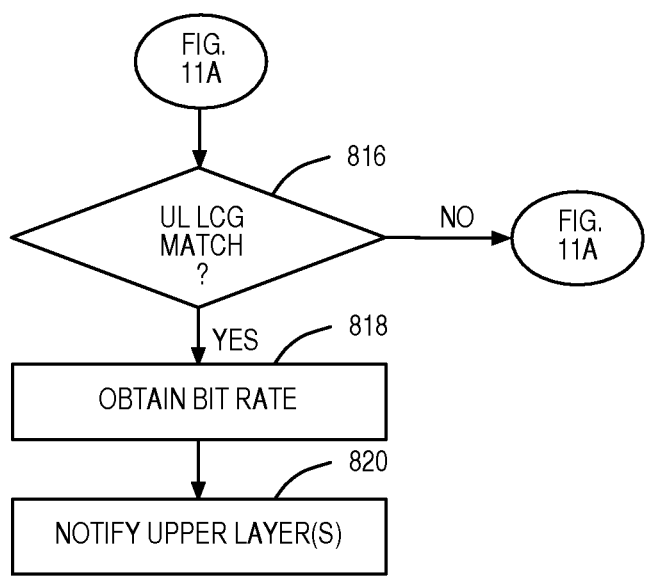
Figure 12:
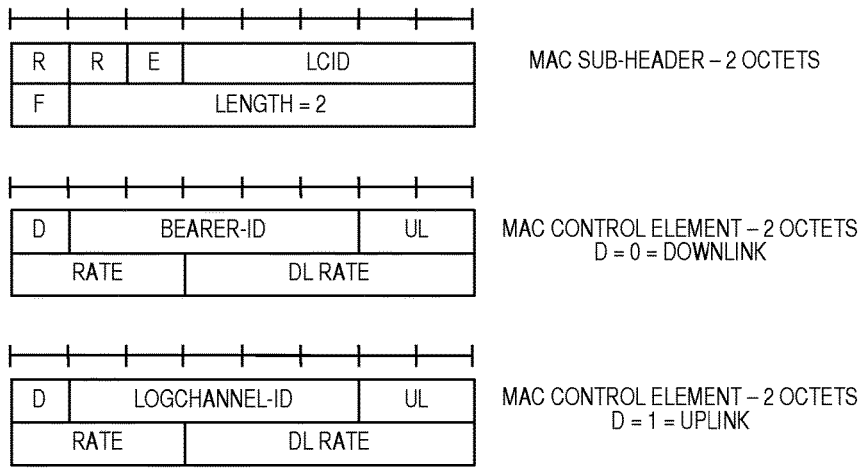
Figure 13:
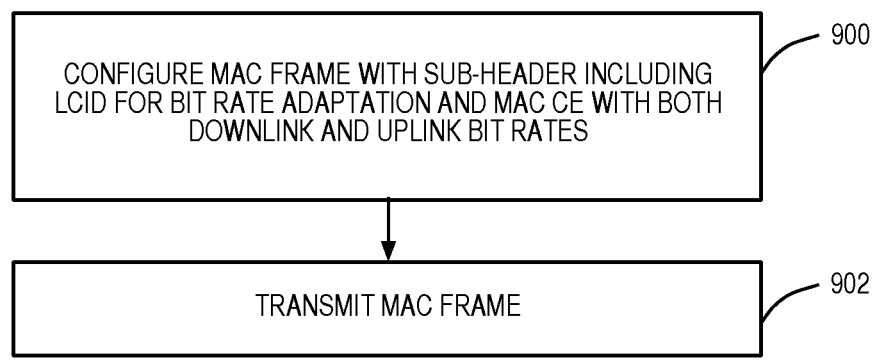
Figure 14A:
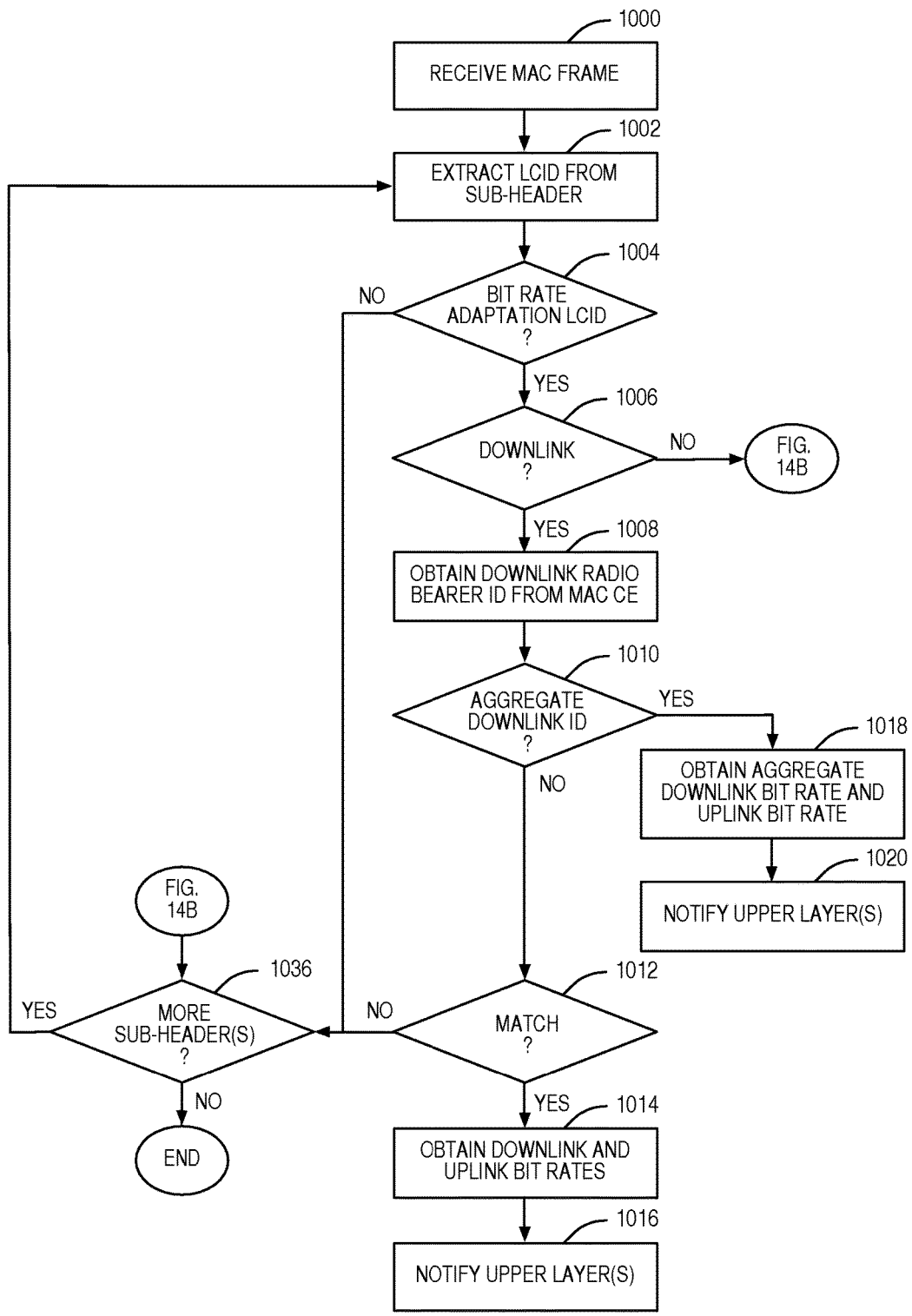
Figure 14B:
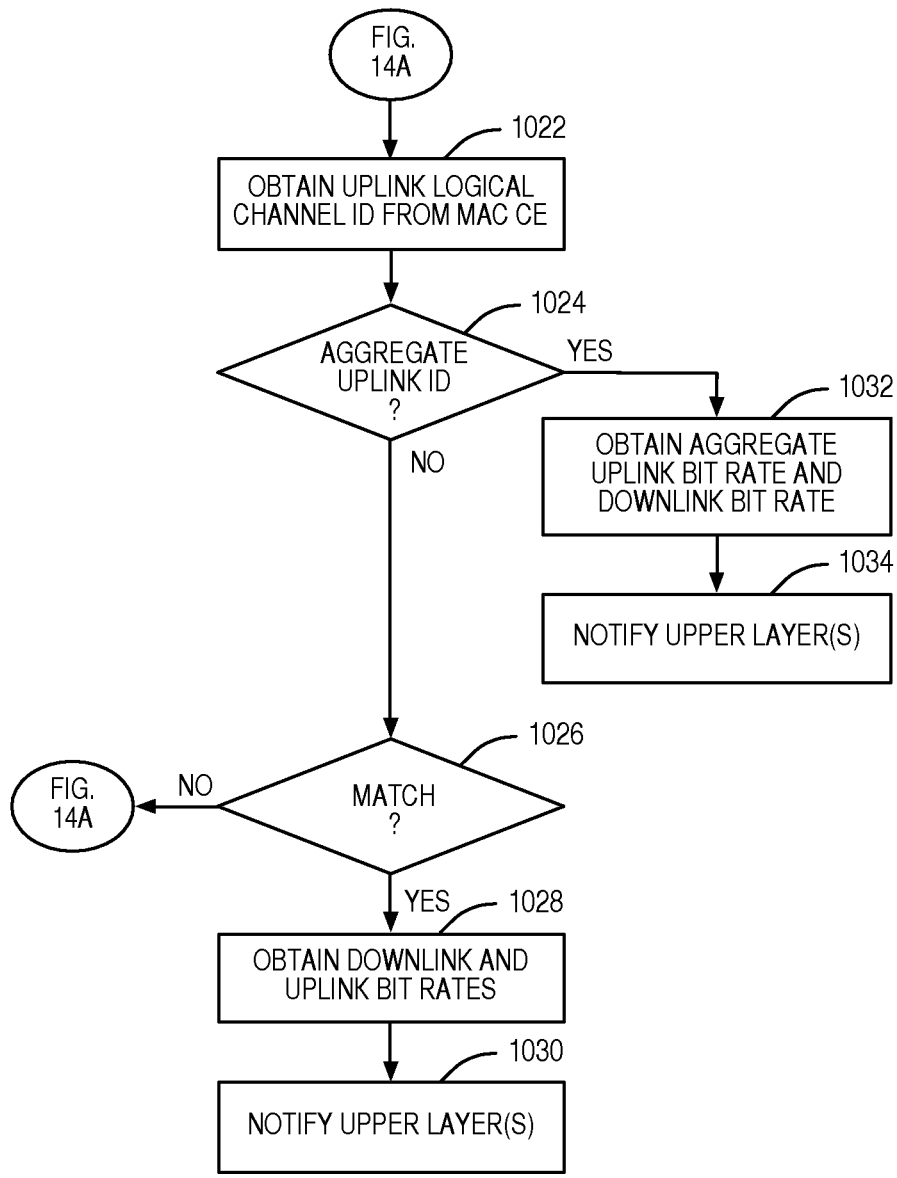
Figure 15A:
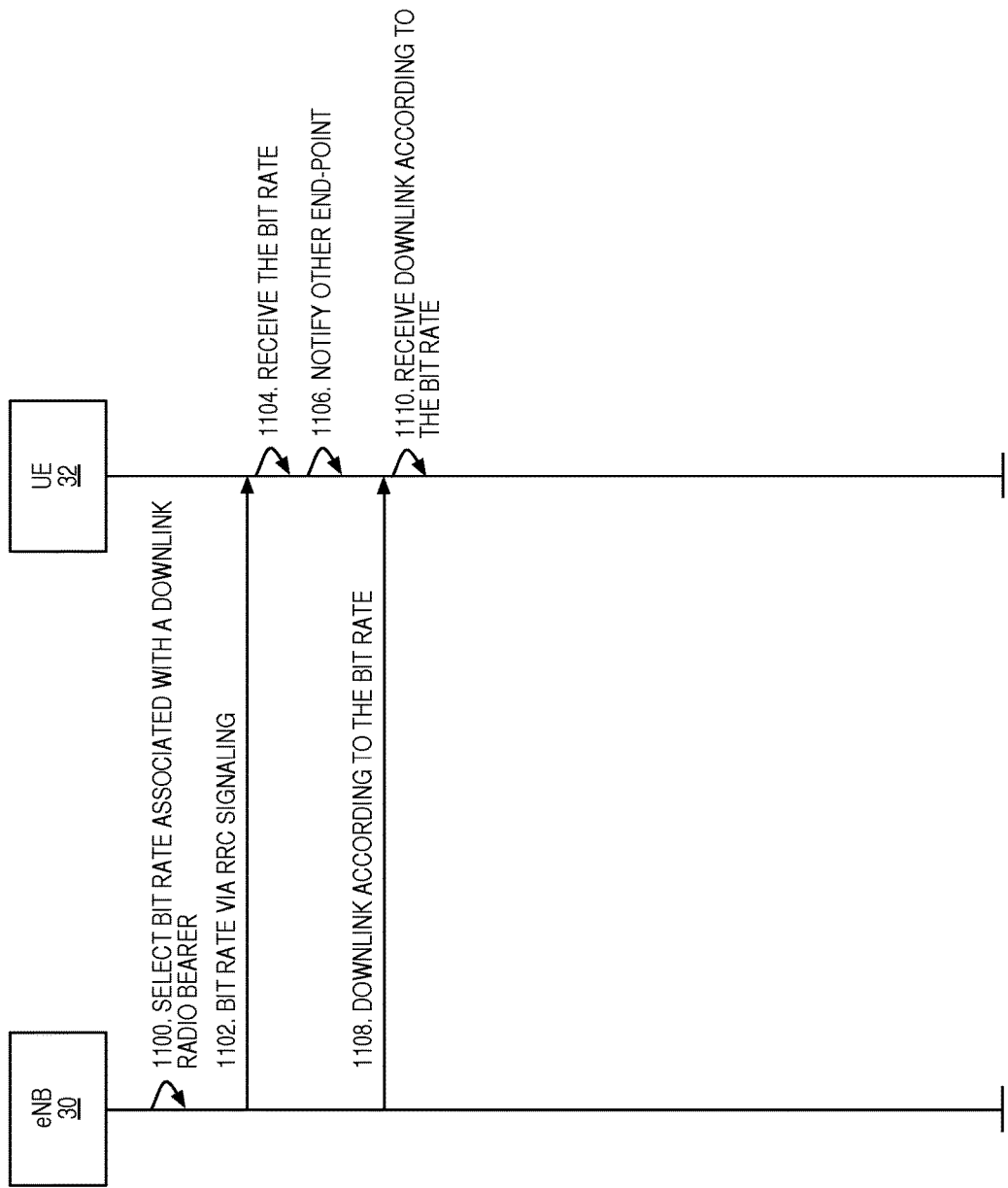
Figure 15B:
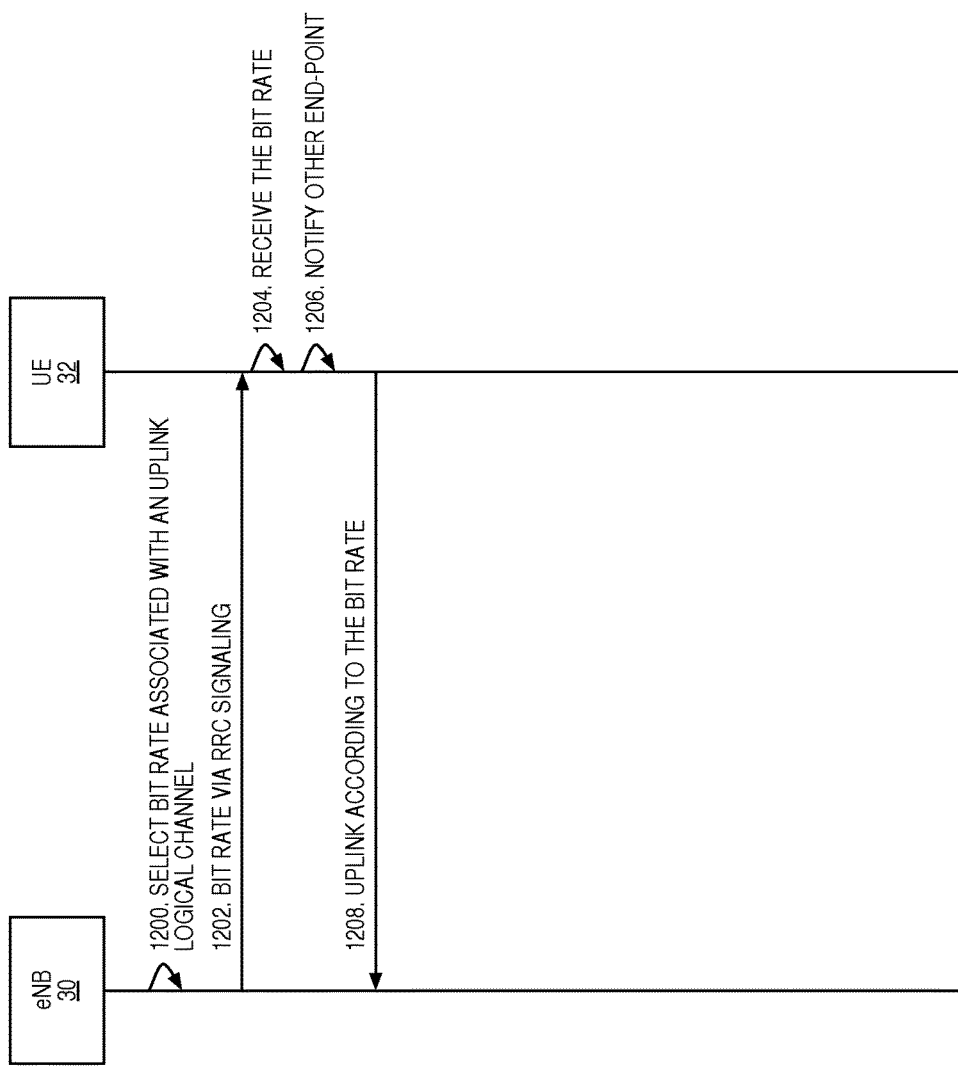
Figure 15C:
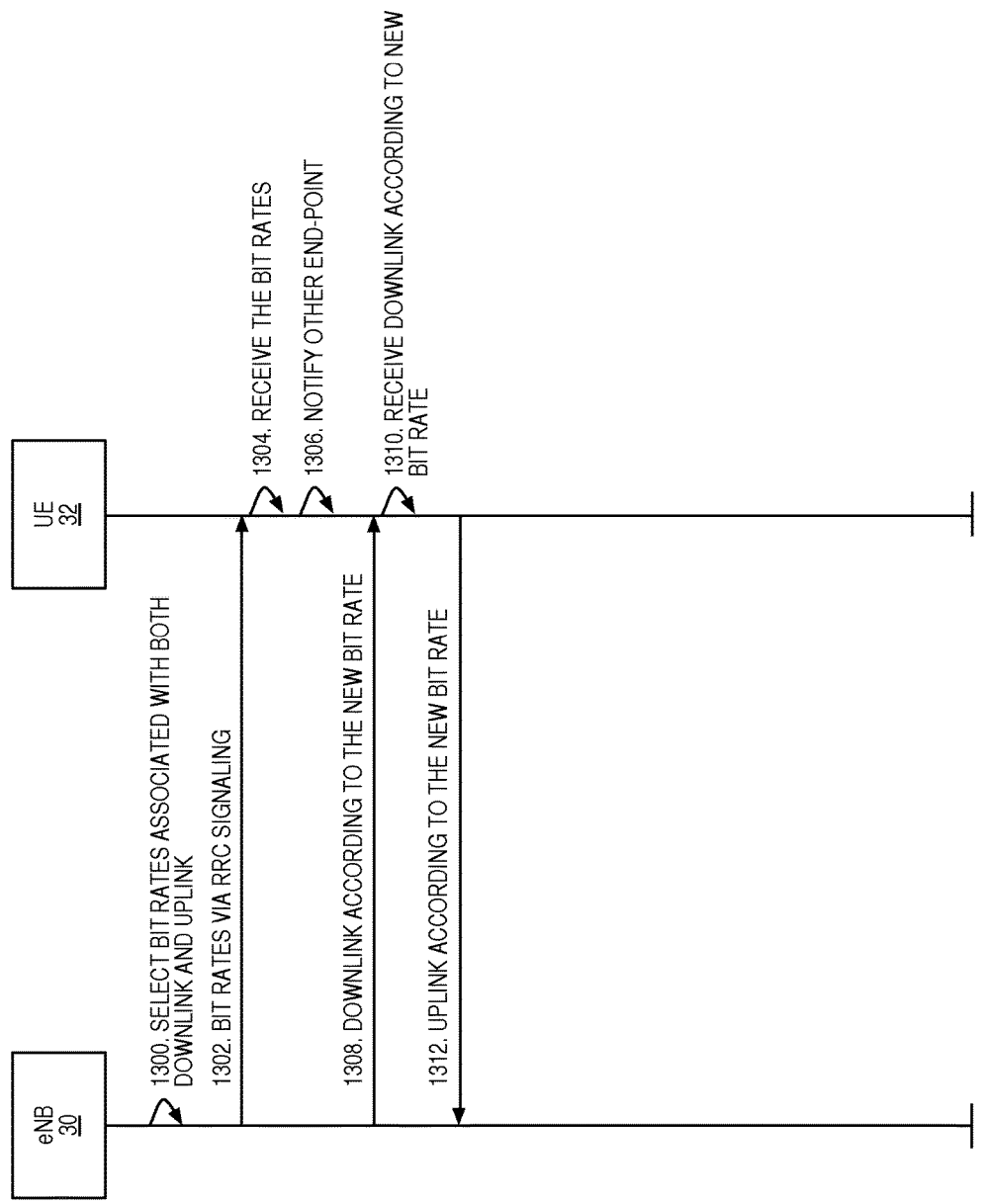
Figure 16:
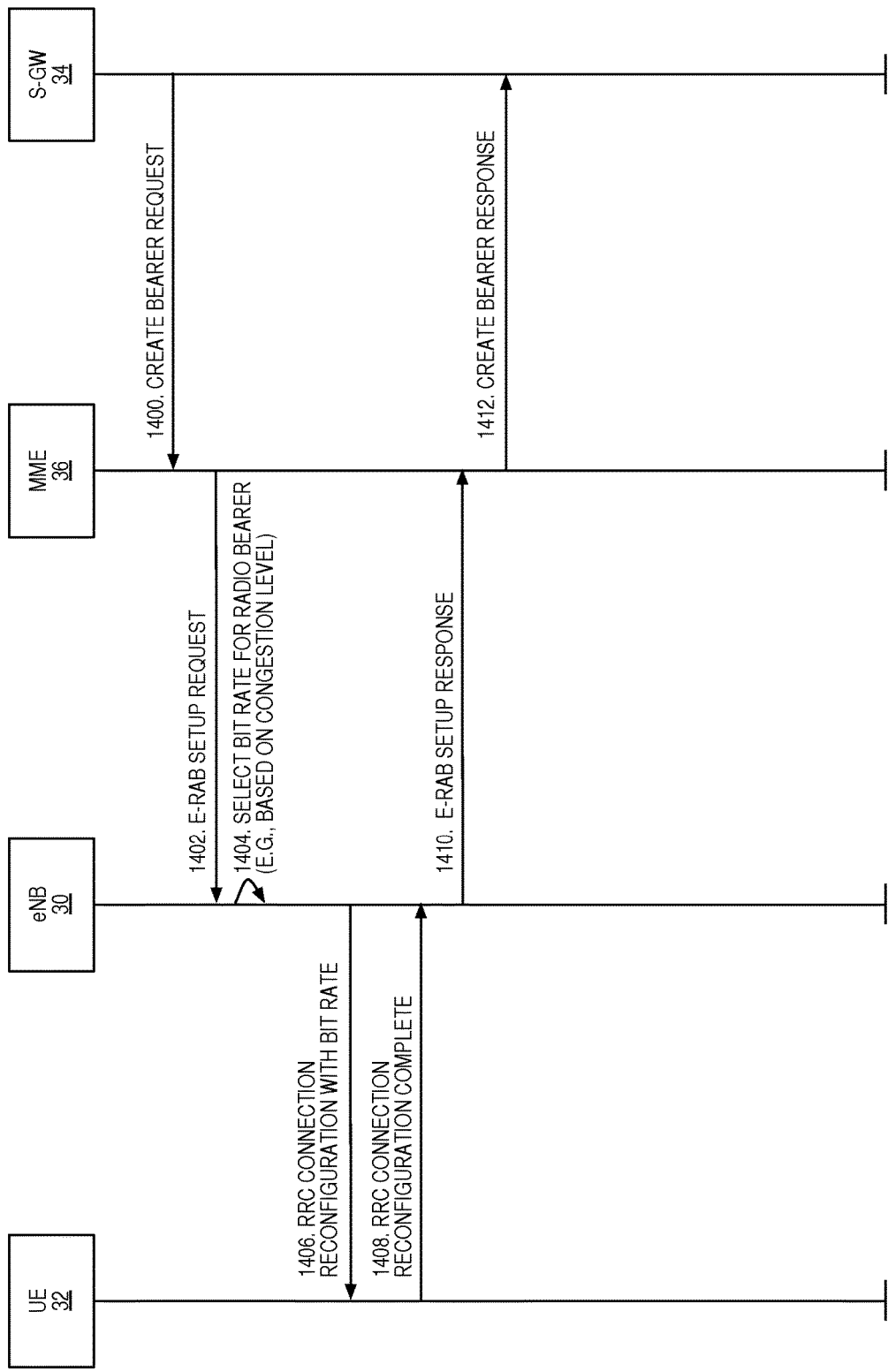
Figure 17:
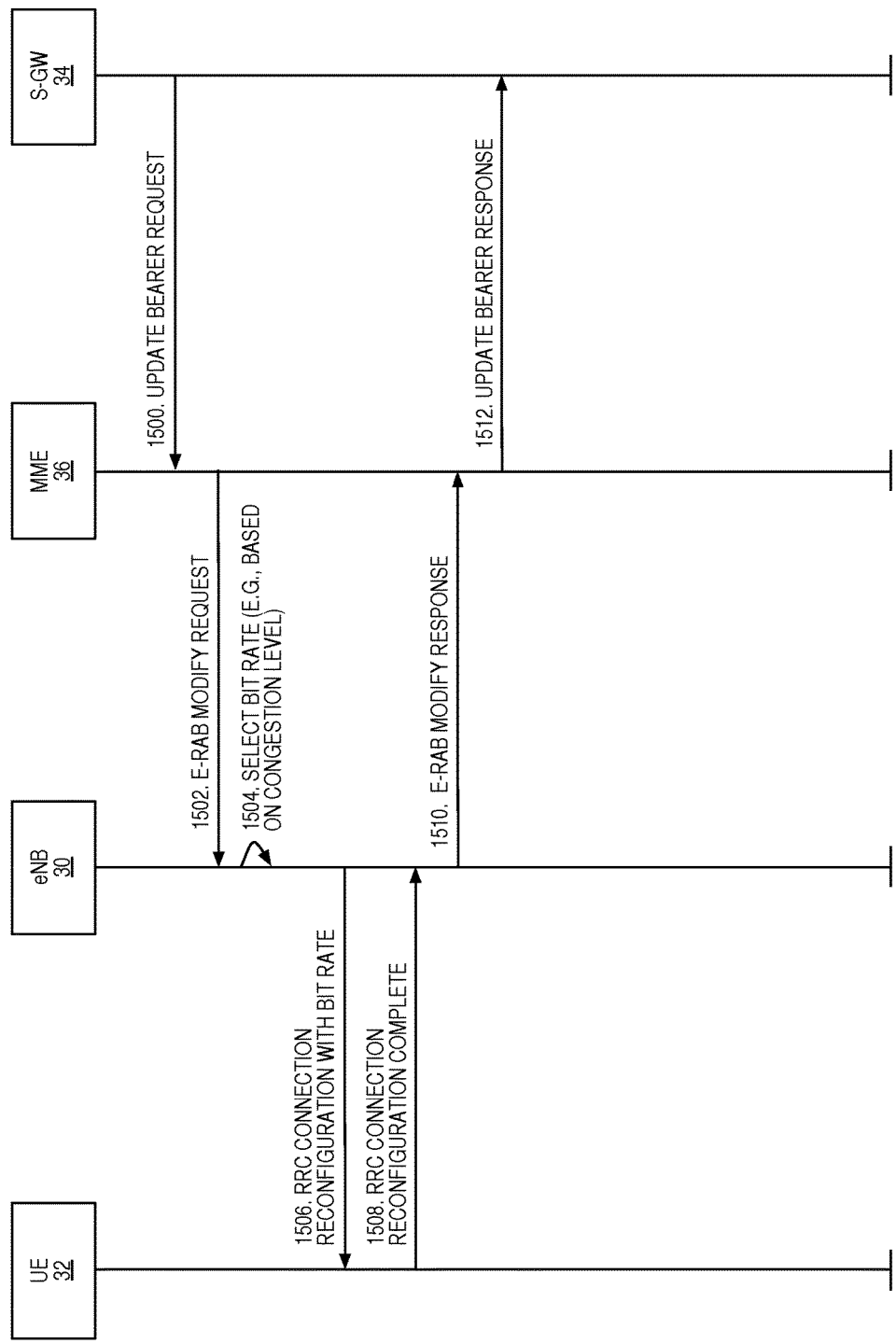
Figure 18:
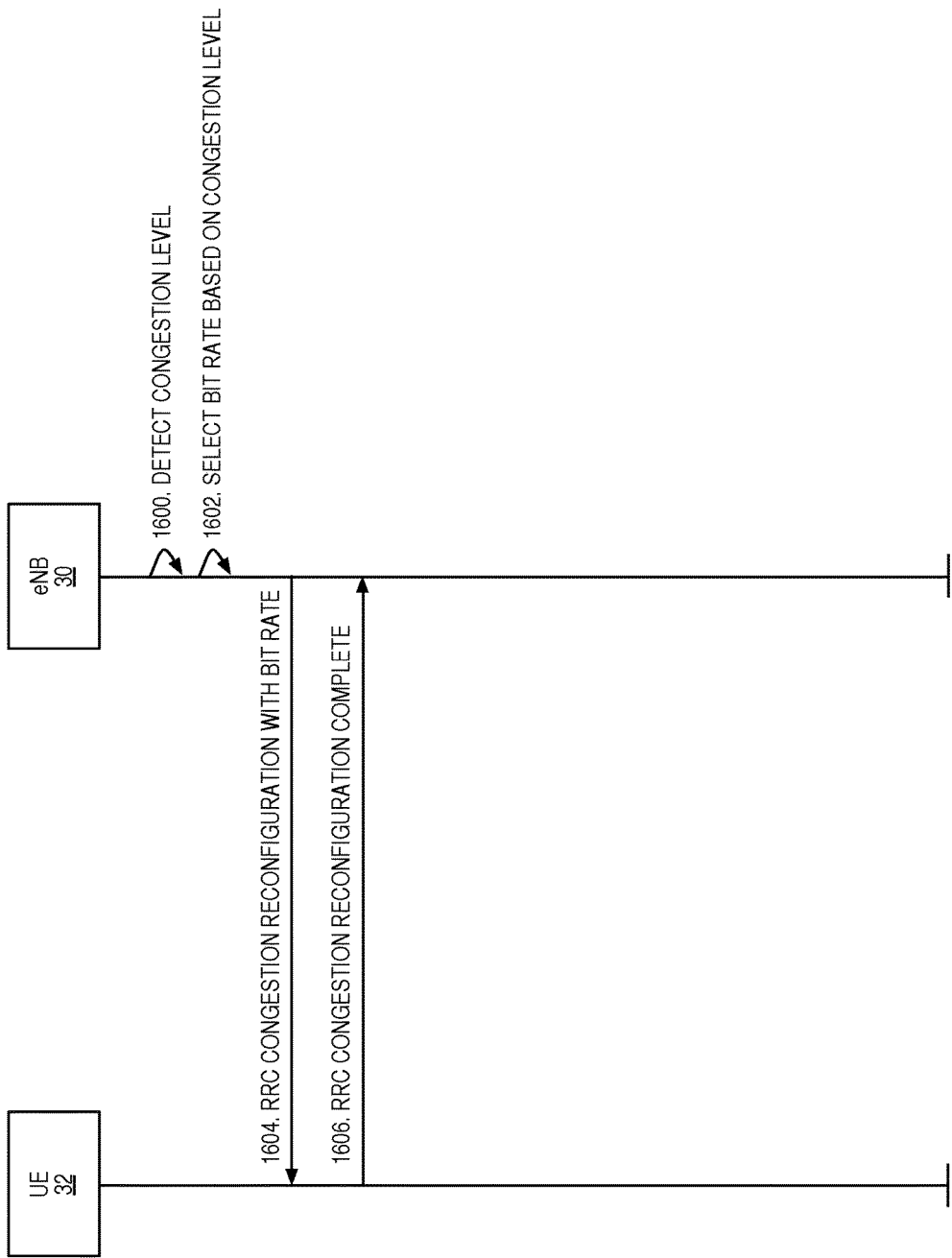
Figure 20:
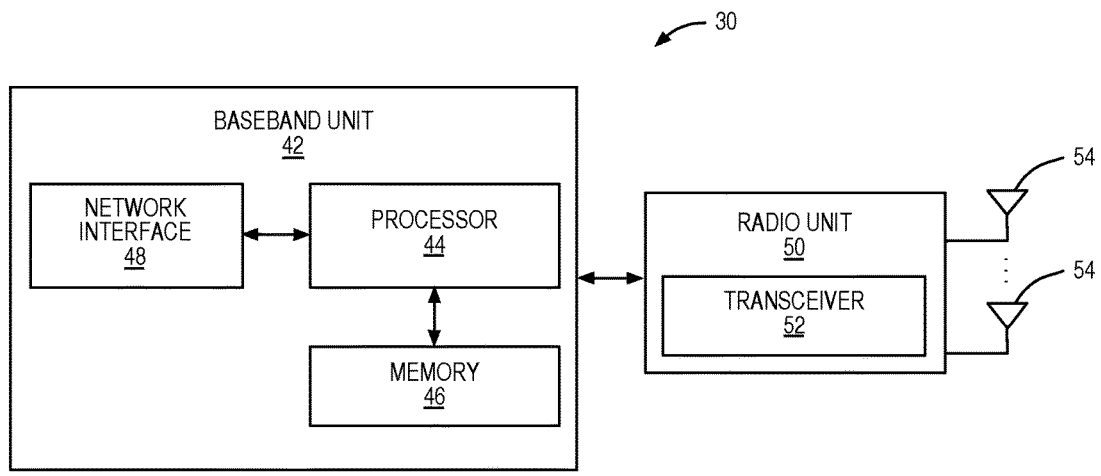
Figure 21:
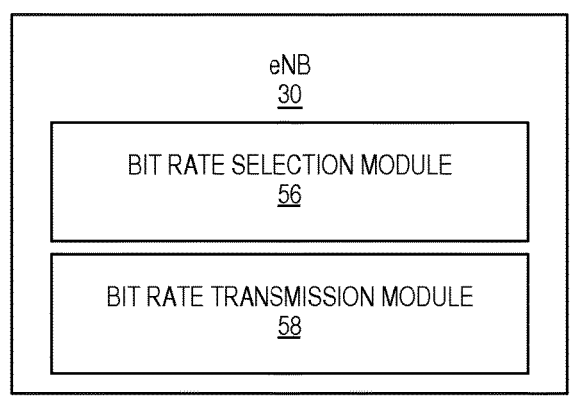
Figure 22:
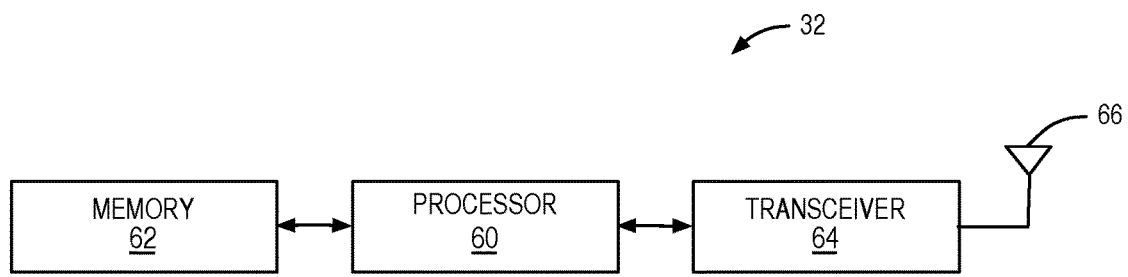
Figure 23:
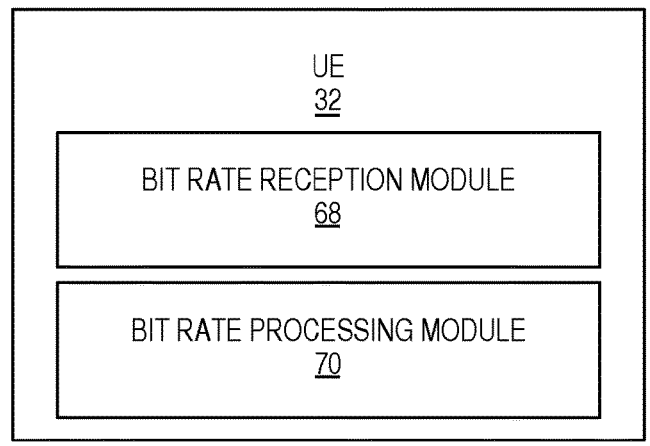

FIG. 5 illustrates a downlink Medium Access Control (MAC) frame structure for an LTE network in which an unused LCID(s) and MAC Control Element(s) (CE(s)) are utilized to transmit a bit rate associated with a downlink radio bearer and/or a bit rate associated with an uplink logical channel between a radio access node (e.g., an enhanced Node B (eNB)) and a wireless device (e.g., a User Equipment device (UE)) according to one embodiment of the present disclosure;

FIG. 6 illustrates encoding of bit rate adaptation information to a MAC sub-header and corresponding MAC CE within the MAC frame structure of FIG. 5 according to one embodiment of the present disclosure;

FIG. 7 is a flow chart that illustrates the operation of a radio access node (e.g., an eNB) to transmit a bit rate associated with a radio bearer in a MAC frame according to the embodiment of FIG. 6;

FIGS. 8A and 8B provide a flow chart that illustrates the operation of a wireless device (e.g., a UE) to receive a bit rate associated with a radio bearer in a MAC frame according to the embodiment of FIG. 6;

FIG. 9 illustrates encoding of bit rate adaptation information to a MAC sub-header and a corresponding MAC CE within the MAC frame structure of FIG. 5 according to another embodiment of the present disclosure;

FIG. 10 is a flow chart that illustrates the operation of a radio access node (e.g., an eNB) to transmit a bit rate for a radio bearer in a MAC frame according to the embodiment of FIG. 9;

FIGS. 11A and 11B provide a flow chart that illustrates the operation of a wireless device (e.g., a UE) to receive a bit rate for a radio bearer in a MAC frame according to the embodiment of FIG. 9;

FIG. 12 illustrates encoding of bit rate adaptation information to a MAC sub-header and a corresponding MAC CE within the MAC frame structure of FIG. 5 according to another embodiment of the present disclosure;

FIG. 13 is a flow chart that illustrates the operation of a radio access node (e.g., an eNB) to transmit both a bit rate associated with a downlink radio bearer and a bit rate associated with an uplink logical channel in a MAC frame according to the embodiment of FIG. 12;

FIGS. 14A and 14B provide a flow chart that illustrates the operation of a wireless device (e.g., a UE) to receive both the bit rate associated with a downlink radio bearer and a bit rate associated with an uplink logical channel in a MAC frame according to the embodiment of FIG. 12;

FIGS. 15A through 15C illustrate direct rate adaptation processes for a downlink radio bearer and/or an uplink logical channel that utilize Radio Resource Control (RRC) signaling according to various embodiments of the present disclosure;

FIG. 16 illustrates a process for dynamically adapting bit rate(s) using an RRC Connection Reconfiguration message for a new connection according to one embodiment of the present disclosure;

FIG. 17 illustrates a process for dynamically adapting bit rate(s) using an RRC Connection Reconfiguration message for modifying an existing connection according to one embodiment of the present disclosure;

FIG. 18 illustrates a process for dynamically adapting bit rate(s) using an RRC Connection Reconfiguration message according to another embodiment of the present disclosure;

FIG. 19 illustrates one example of a new Information Element (IE) for the RRC Connection Reconfiguration message that is used for downlink bit rate adaptation according to one embodiment of the present disclosure;

FIG. 20 is a block diagram of a radio access node according to one embodiment of the present disclosure;

FIG. 21 is a block diagram of a radio access node according to another embodiment of the present disclosure;

FIG. 22 is a block diagram of a wireless device according to one embodiment of the present disclosure; and FIG. 23 is a block diagram of a wireless device according to another embodiment of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Systems and methods relating to direct bit rate adaptation for end-to-end communication via a cellular communications network are disclosed. In the embodiments described below, the cellular communications network is a $3^{rd}$ Generation Partnership Project (3GPP) Long Term Evolution (LTE) network and, as such, LTE terminology is sometimes used. Note, however, that the embodiments disclosed herein may be applicable to other types of cellular communications networks.

Figure 1:
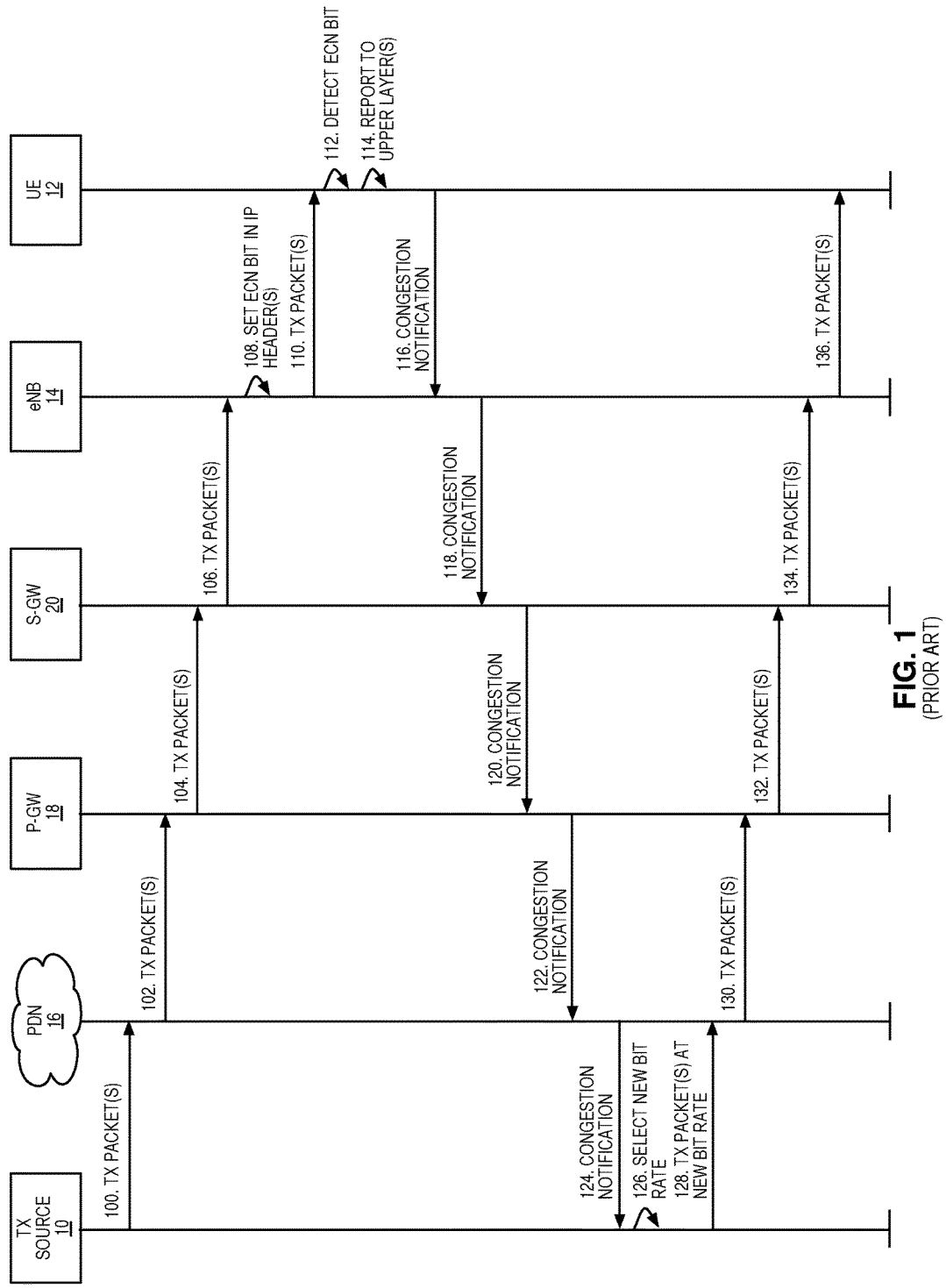
FIG. 1 illustrates a conventional Explicit Congestion Notification (ECN) procedure.
Figure 2:
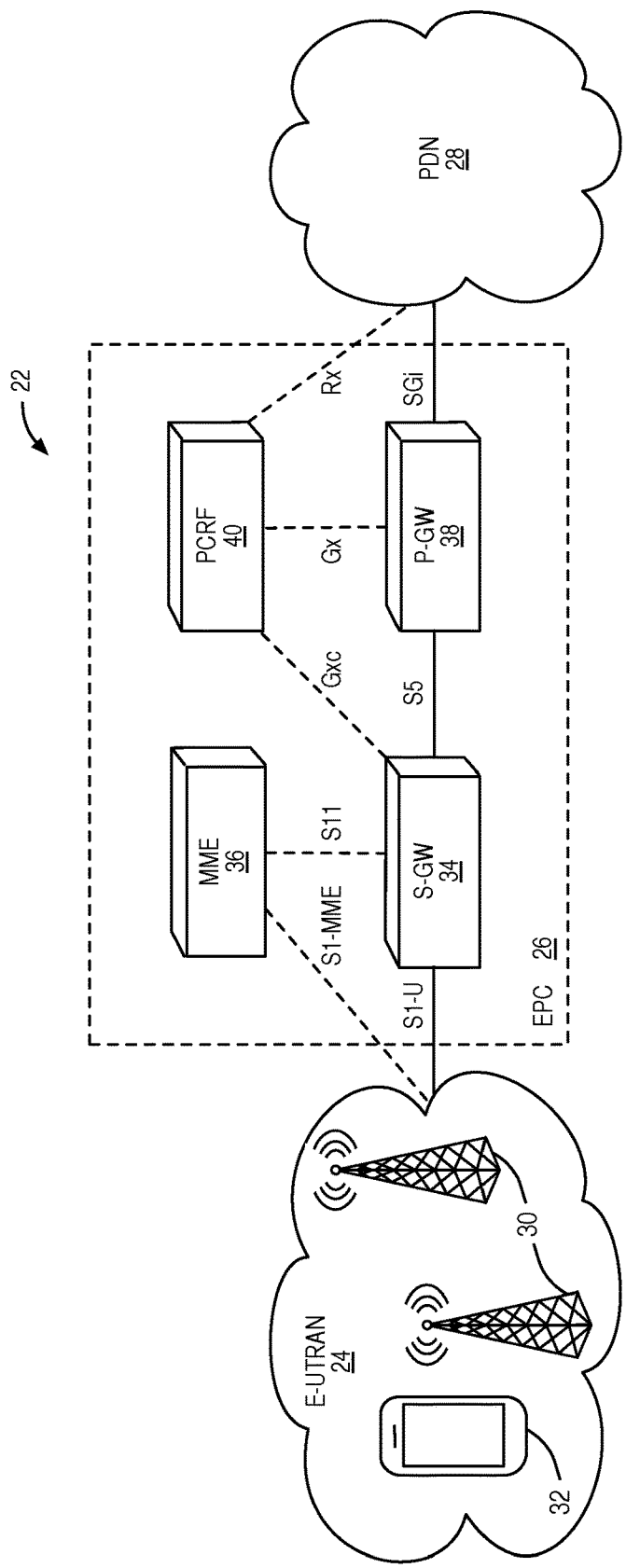
FIG. 2 illustrates a Long Term Evolution (LTE) network in which direct rate adaptation for an end-to-end communication path through the LTE network is performed by an LTE network node according to one embodiment of the present disclosure.

FIG. 2 illustrates a LTE network 22 in which direct rate adaptation for an end-to-end communication path through the LTE network 22 is performed by an LTE network node according to one embodiment of the present disclosure. The LTE network 22 includes an Evolved Universal Terrestrial Radio Access Network (E-UTRAN) 24 and an Evolved Packet Core (EPC) network 26 connected to a Packet Data Network (PDN) 28. The E-UTRAN 24 includes one or more Enhanced, or Evolved, Node Bs (eNBs) 30 that operate to provide radio access to User Equipment devices (UEs) 32 located in the E-UTRAN 24. The EPC network 26 includes a Serving Gateway (S-GW) 34, a Mobility Management Entity (MME) 36, a PDN Gateway (P-GW) 38, and a Policy Charging and Rules Function (PCRF) 40.

The S-GW 34 serves as the main node responsible for connecting the E-UTRAN 24 (and in particular a group of eNBs 30) to the EPC network 26 and acts as a mobility anchor for the UE(s) 32 as the UE(s) 32 move between eNBs 30 in the E-UTRAN 24. The MME 36 is responsible for managing bearers, handling UE 32 transitions, and performing authentication of the UE 32. The P-GW 38 connects the EPC network 26 to the PDN 28 and performs functions such as, e.g., allocating Internet Protocol (IP) addresses and enforcing Quality of Service (QoS) rules provided by the PCRF 40. The PCRF 40 is generally responsible for QoS handling and charging.

As discussed below in detail, an end-to-end communication path is established between the UE 32 (or other wireless device served by the LTE network 22), as a first end-point, and a second end-point. The end-to-end communication path includes a radio bearer (i.e., a downlink radio bearer or an uplink logical channel (which may also be referred to as an uplink radio bearer)) between the UE 32 and the E-UTRAN 24 (e.g., a radio bearer between the UE 32 and a radio access node in the E-UTRAN 24 such as, for instance, the eNB 30). Notably, within this disclosure, "logical channel" and "radio bearer" are exchangeable terms, except in the case when a "Logical Channel Identifier" is used to identify a MAC CE. The UE 32 may be either the receiving end-point of the end-to-end communication path or the transmitting end-point of the end-to-end communication path. The second end-point may be, e.g., a node connected directly or indirectly to the PDN 28 or another UE 32 (or other wireless device) connected to the E-UTRAN 24. For example, the second end-point may be a web server, and the end-to-end communication path may be a communication path for, e.g., streaming video from the web server to the UE 32.

An LTE network node, e.g., the eNB 30 or other radio access node (e.g., a relay, a Remote Radio Unit (RRU), etc.), operates to control, or adapt, a bit rate for the end-to-end communication path between the UE 32 and the second end-point by directly controlling a bit rate associated with the radio bearer between the eNB 30 and the UE 32. As discussed below, in one embodiment, the radio bearer is a downlink radio bearer, and the bit rate associated with the downlink radio bearer is either a bit rate for the downlink radio bearer or an aggregate bit rate for all downlink radio bearers for the UE 32. In another embodiment, the radio bearer is an uplink logical channel (which may also be referred to as an uplink radio bearer), and the bit rate associated with the uplink logical channel is either a bit rate for the uplink logical channel or an aggregate bit rate for all uplink logical channels for the UE 32.

In some embodiments, the LTE network node directly controls the bit rate associated with the radio bearer as a function of a congestion level in the LTE network 22, e.g., in the E-UTRAN 24. For example, at very low congestion levels, the LTE network node may directly set the bit rate associated with the radio bearer between the UE 32 and the corresponding eNB 30 to a maximum bit rate. The second end-point may then be notified of this maximum bit rate. In this manner, the LTE network node has control of the bit rate for the end-to-end communication path. Conversely, as the congestion level increases, the LTE network node may directly decrease the bit rate associated with the radio bearer between the UE 32 and the corresponding eNB 30. Again, the second end-point may then be notified of the reduced bit rate. As discussed below, in some embodiments, the bit rate is communicated from the eNB 30 to the UE 32 via a Medium Access Control (MAC) Control Element (CE). In other embodiments, bit rate adaptation is achieved through Radio Resource Control (RRC) signaling.

Figure 3A:
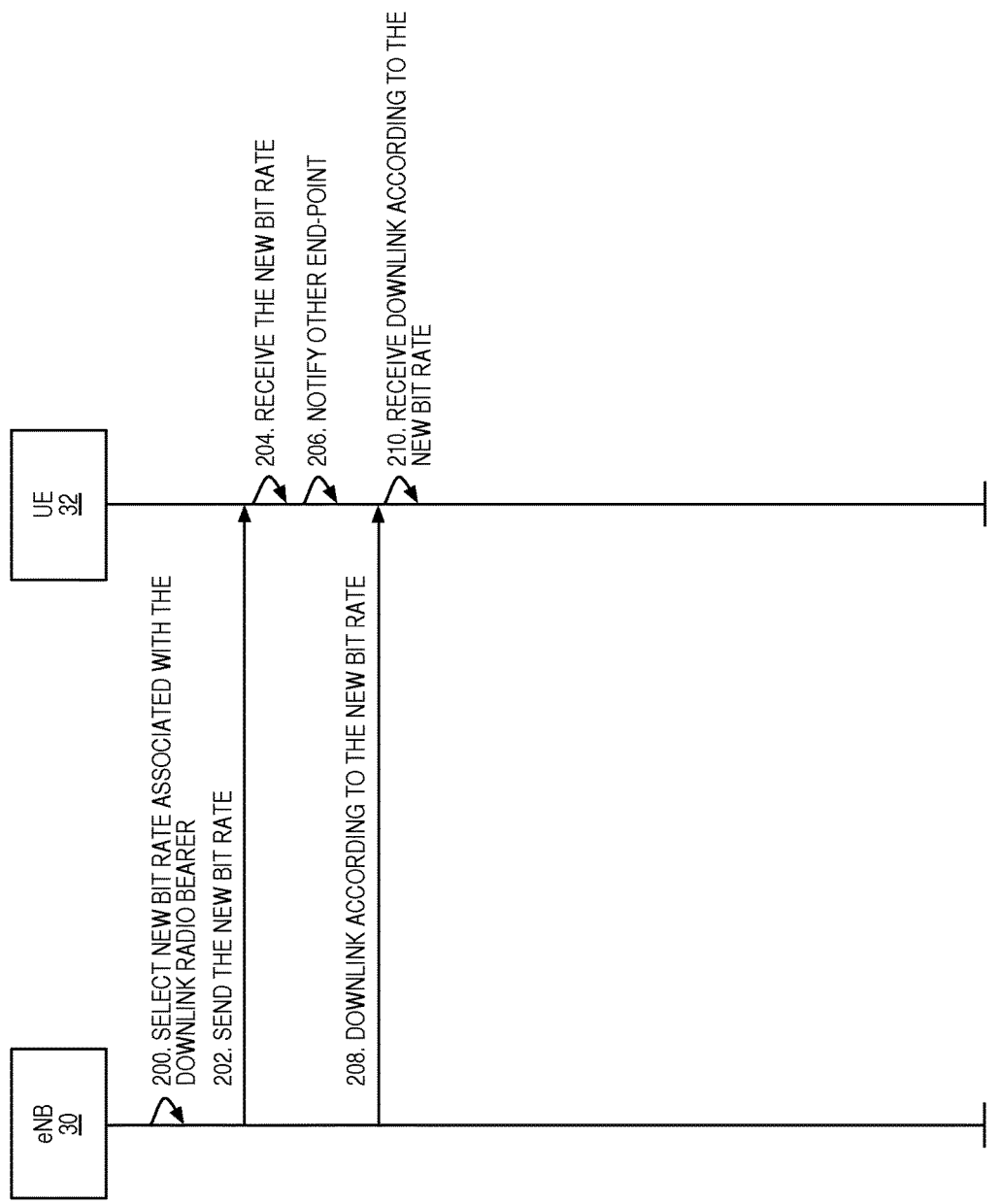
FIGS. 3A-3C illustrate direct rate adaptation processes for a downlink radio bearer, an uplink logical channel, and both a downlink radio bearer and an uplink logical channel, respectively, according to various embodiments of the present disclosure.
Figure 3B:
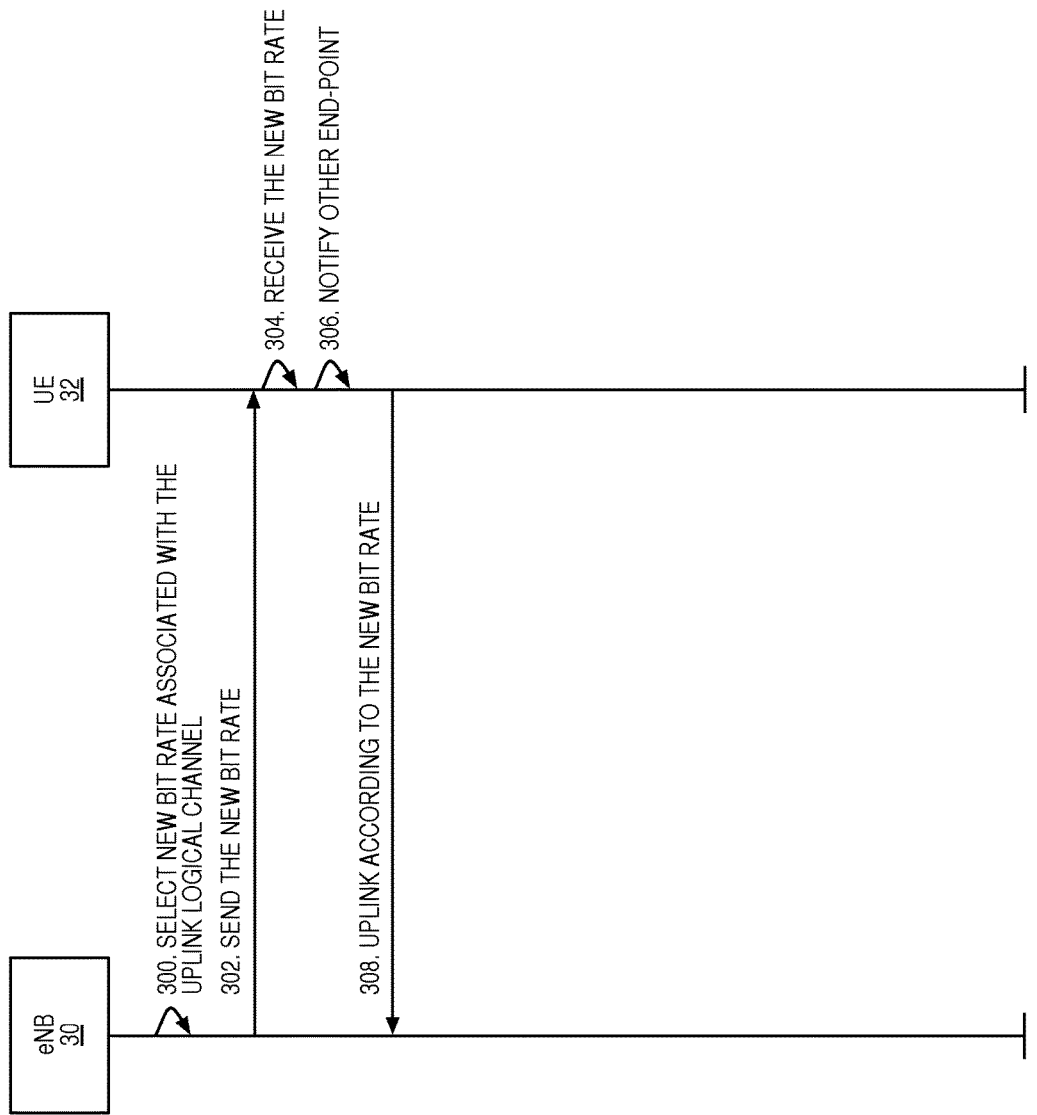
Figure 3C:
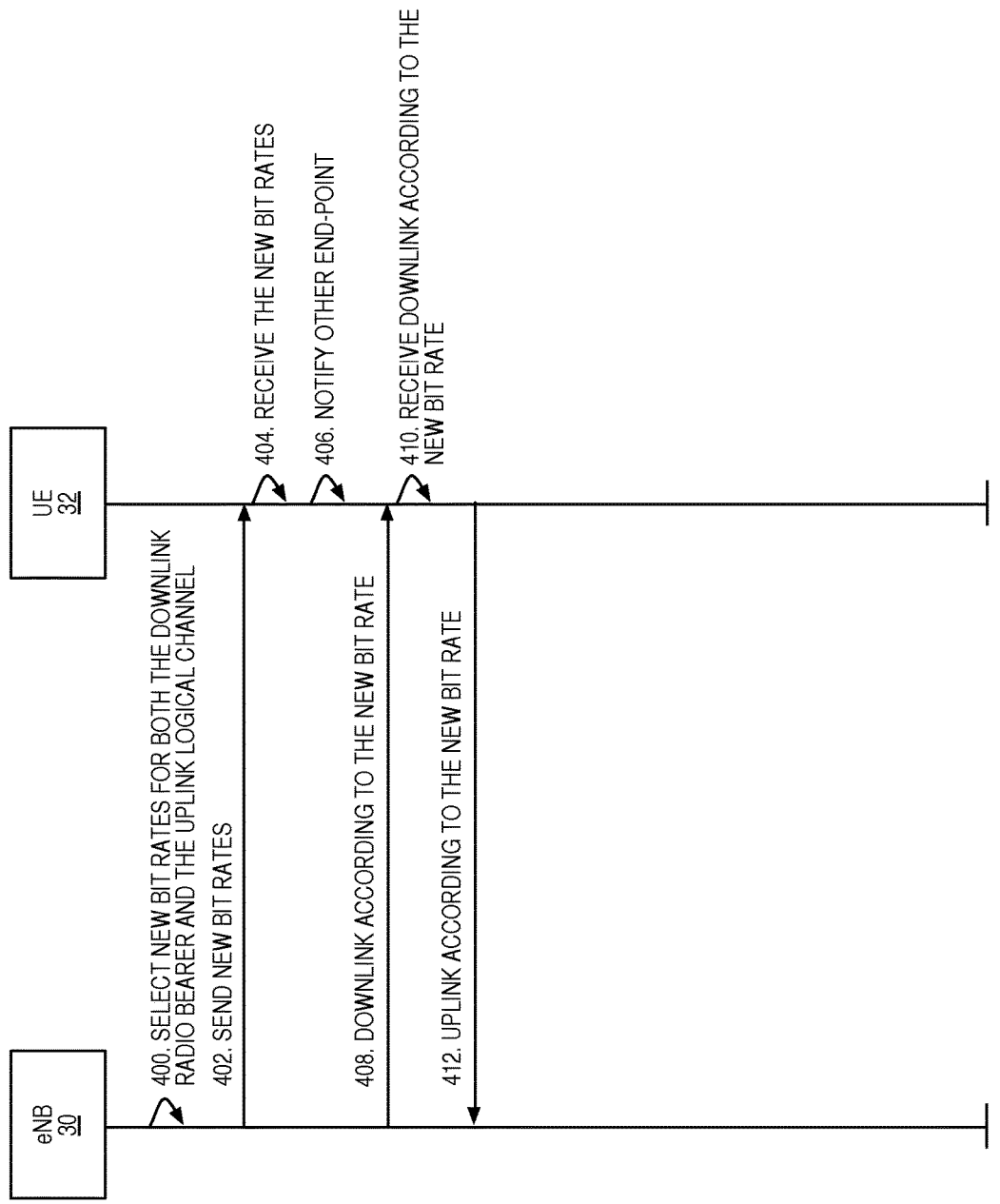

FIGS. 3A through 3C illustrate direct rate adaptation processes for a downlink radio bearer, an uplink logical channel, and both a downlink radio bearer and an uplink logical channel, respectively, according to various embodiments of the present disclosure. More specifically, in FIG. 3A, the UE 32 is the receiving end-point of the end-to-end communication. As such, the communication path from the transmitting end-point of the end-to-end communication path to the UE 32 includes a downlink radio bearer between the eNB 30 and the UE 32. At some point, the eNB 30 decides or otherwise determines that the bit rate of the downlink radio bearer, and thus the bit rate of the end-to-end communication path, is to be changed. For example, the eNB 30 may detect or be notified of a congestion level in the LTE network 22 such as, e.g., a congestion level in the cell served by the eNB 30 and to which the UE 32 is connected. The eNB 30 then selects a new bit rate associated with the downlink radio bearer (step 200). As used herein, a bit rate "associated with" the downlink radio bearer is either a bit rate for the downlink radio bearer or an aggregate downlink bit rate for all downlink radio bearers to the UE 32. While the manner in which the new bit rate is selected is outside of the scope of the present disclosure, in one embodiment, the eNB 30 selects the new bit rate based on the congestion level in the LTE network 22 (e.g., the congestion level in the cell served by the eNB 30 and to which the UE 32 is connected). For example, the new bit rate may be inversely related to the congestion level.

Once the new bit rate is selected, the eNB 30 sends, or transmits, the new bit rate to the UE 32 (step 202). In this manner, the eNB 30 directly sets the bit rate associated with the downlink radio bearer and thereby controls the bit rate for the end-to-end communication path. The eNB 30 may transmit the new bit rate by transmitting a value that is, e.g., a binary value corresponding to the new bit rate or bit pattern that is mapped to a desired bit rate in a predefined set of bit rates. As discussed below, in some embodiments, the eNB 30 transmits the new bit rate in a MAC CE. By transmitting the new bit rate at the MAC layer, the eNB 30 is enabled to efficiently update or change the bit rate as desired.

At the UE 32, the UE 32 receives the new bit rate from the eNB 30 (step 204). In response, the UE 32 notifies the transmitting end-point of the end-to-end communication path of the new bit rate (step 206). While not illustrated, the transmitting end-point then adjusts the bit rate at which it is transmitting according to the new bit rate. Thus, in this manner, the eNB 30 has controlled the bit rate of the end-to-end communication path. Thereafter, the eNB 30 transmits the downlink to the UE 32 on the downlink radio bearer according to the new bit rate, and the UE 32 receives the downlink on the downlink radio bearer according to the new bit rate (steps 208 and 210). Notably, this process may be repeated as desired by the eNB 30 to dynamically adjust, or adapt, the bit rate to, e.g., the congestion level in the LTE network 22.

In the embodiment of FIG. 3B, the UE 32 is the transmitting end-point of the end-to-end communication path. As such, the communication path from the UE 32 to the receiving end-point of the end-to-end communication path includes an uplink logical channel (which may also be referred to as an uplink radio bearer) between the eNB 30 and the UE 32. At some point, the eNB 30 decides or otherwise determines that the bit rate of the uplink logical channel, and thus the bit rate of the end-to-end communication path, is to be changed. For example, the eNB 30 may detect or be notified of a congestion level in the LTE network 22 such as, e.g., a congestion level in the cell served by the eNB 30 and to which the UE 32 is connected. The eNB 30 then selects a new bit rate associated with the uplink logical channel (step 300). As used herein, a bit rate "associated with" the uplink logical channel is either a bit rate for the uplink logical channel, a bit rate for a corresponding uplink logical channel group, or an aggregate uplink bit rate for all uplink logical channels from the UE 32. While the manner in which the new bit rate is selected is outside of the scope of the present disclosure, in one embodiment, the eNB 30 selects the new bit rate based on the congestion level in the LTE network 22 (e.g., the congestion level in the cell served by the eNB 30 and to which the UE 32 is connected). For example, the new bit rate may be inversely related to the congestion level.

Once the new bit rate is selected, the eNB 30 sends, or transmits, the new bit rate to the UE 32 (step 302). In this manner, the eNB 30 directly sets the bit rate associated with the uplink logical channel and thereby controls the bit rate for the end-to-end communication path. The eNB 30 may transmit the new bit rate by transmitting a value that is, e.g., a binary value corresponding to the new bit rate or bit pattern that is mapped to a desired bit rate in a predefined set of bit rates. As discussed below, in some embodiments, the eNB 30 transmits the new bit rate in a MAC CE transmitted on a downlink radio bearer between the eNB 30 and the UE 32. By transmitting the new bit rate at the MAC layer, the eNB 30 is enabled to efficiently update or change the bit rate as desired.

At the UE 32, the UE 32 receives the new bit rate associated with the uplink logical channel from the eNB 30 (step 304). The UE 32 then operates according to the new bit rate. For example, in some embodiments, the UE 32 notifies the receiving end-point of the end-to-end communication path of the new bit rate (step 306). The UE 32 then transmits the uplink on the uplink logical channel according to the new bit rate (step 308). While not illustrated, the eNB 30 then propagates the communication to the receiving end-point over the end-to-end communication path through the EPC network 26. In this manner, the eNB 30 has controlled the bit rate of the end-to-end communication path. More specifically, in some embodiments, the new bit rate is provided at the MAC layer, and a MAC scheduler of the UE 32 uses the new bit rate to update or replace the Prioritized Bit Rate (PBR) value associated with the uplink logical channel. As defined by 3GPP, the PBR is used by a scheduler of the UE 32. The MAC layer may then notify one or more upper layers, e.g., the Transport layer (e.g., the Transmission Control Protocol (TCP) or the Real-Time Transport Protocol (RTP) layer) and the application layer of the new bit rate. Notably, this process may be repeated as desired by the eNB 30 to dynamically adjust, or adapt, the bit rate to, e.g., the congestion level in the LTE network 22.

FIG. 3C is similar to FIGS. 3A and 3B but where eNB 30 controls both the bit rate associated with the downlink radio bearer and the bit rate associated with the uplink logical channel between the eNB 30 and the UE 32. More specifically, in FIG. 3C, there are two end-to-end communication paths between the UE 32 and the other end-point, one in each direction. As such, for one end-to-end communication path, the UE 32 is the receiving end-point of the end-to-end communication path and, therefore, the end-to-end communication path from the transmitting end-point to the UE 32 includes a downlink radio bearer between the eNB 30 and the UE 32. For the other end-to-end communication path, the UE 32 is the transmitting end-point and, therefore, the end-to-end communication path from the UE 32 to the receiving end-point includes an uplink logical channel between the eNB 30 and the UE 32.

At some point, the eNB 30 decides or otherwise determines that the bit rate associated with the downlink radio bearer and the bit rate associated with the uplink logical channel, and thus the bit rate of the end-to-end communication paths, is to be changed, as discussed above. The eNB 30 then selects a new bit rate associated with the downlink radio bearer and a new bit rate associated with the uplink logical channel, as discussed above (step 400). Once the new bit rates are selected, the eNB 30 sends, or transmits, the new bit rates associated with the downlink radio bearer and the uplink logical channel to the UE 32 (step 402). In this manner, the eNB 30 directly sets the bit rates associated with the downlink radio bearer and the uplink logical channel and thereby controls the bit rates for the two end-to-end communication paths. As discussed above, the eNB 30 may transmit the new bit rates by transmitting values that are, e.g., binary values corresponding to the new bit rates or bit patterns that are mapped to the desired bit rates in a predefined set of bit rates. As discussed below, in some embodiments, the eNB 30 transmits the new bit rates in a MAC CE. By transmitting the new bit rate at the MAC layer, the eNB 30 is enabled to efficiently update or change the bit rate as desired.

At the UE 32, the UE 32 receives the new bit rates from the eNB 30 (step 404). In response, the UE 32 notifies the other end-point of the end-to-end communication paths of the new bit rate (step 406). While not illustrated, the other end-point then adjusts the bit rate at which it is transmitting/receiving according to the new bit rates. Thus, in this manner, the eNB 30 has controlled the bit rates of the end-to-end communication paths between the other end-point and the UE 32. Thereafter, the eNB 30 transmits the downlink to the UE 32 on the downlink radio bearer according to the new bit rate associated with the downlink radio bearer, and the UE 32 receives the downlink on the downlink radio bearer according to the new bit rate (steps 408 and 410). In addition, with respect to the end-to-end communication path from the UE 32 to the other end-point, the UE 32 transmits the uplink on the uplink logical channel according to the new bit rate associated with the uplink logical channel (step 412). Notably, this process may be repeated as desired by the eNB 30 to dynamically adjust, or adapt, the bit rates to, e.g., the congestion level in the LTE network 22.

As discussed above, in some embodiments, the bit rate(s) is(are) communicated from the eNB 30 (or other radio access node) to the UE 32 (or other wireless device) via a MAC CE. FIG. 4 is a table of Logical Channel Identifiers (LCIDs) as defined for LTE networks in 3GPP Technical Specification (TS) 36.321 V12.1.0 but with the additional definition of LCIDs 11000 and 11001 as being indicative of bit rate adaptation. These two LCIDs are only examples. Any unused LCID value(s) may be used. Note that while two LCIDs are defined for bit rate adaptation in this example, there may be only one LCID value defined for bit rate adaptation or there may be more than two LCIDs defined for bit rate adaptations. Importantly, the LCID(s) defined for bit rate adaptation are previously unused LCID (s) as defined by 3GPP TS 36.321 V12.1.0. Notably, the LCIDs defined in the table of FIG. 4 are utilized within sub-headers of the MAC frame and are to be distinguished from the uplink logical channel between the eNB 30 and the UE 32.

FIG. 5 illustrates a downlink MAC frame structure for the LTE network 22 in which the LCID(s) defined for bit rate adaptation in the table of FIG. 4 are utilized to transmit a bit rate(s) associated with a downlink radio bearer and/or a bit rate associated with an uplink logical channel between a radio access node (e.g., the eNB 30) and a wireless device (e.g., the UE 32) according to one embodiment of the present disclosure. As illustrated, the MAC frame structure includes a number of sub-headers and a number of MAC CEs. Each sub-header corresponds to one of the MAC CEs. In order to transmit a bit rate(s), the radio access node transmits one of the LCIDs defined for bit rate adaptation in one of the sub-headers to thereby indicate that the corresponding MAC CE contains bit rate adaptation information.

The bit rate associated with the radio bearer(s) is(are) then transmitted in the corresponding MAC CE along with information that either identifies the bit rate(s) as an aggregate bit rate(s) or identifies the corresponding radio bearer(s).

More specifically, FIG. 6 illustrates encoding of bit rate adaptation information to a MAC sub-header and a corresponding MAC CE within the MAC frame structure of FIG. 5 according to one embodiment of the present disclosure. As illustrated, the MAC sub-header is 1 octet, or 2 octets if length is added. The MAC sub-header includes reserved fields (R), an extended field (E), and an LCID field. In this embodiment, the LCID field is set to the LCID 11000 to indicate that an uplink bit rate is transmitted in the corresponding MAC CE or the LCID 11001 to indicate that a downlink bit rate is transmitted in the corresponding MAC CE. The MAC CE is also 1 octet. If the LCID field of the MAC sub-header is set to 11000, then the MAC CE includes a Bearer-ID field that includes: (1) a radio bearer Identifier (ID) that either identifies a downlink radio bearer or identifies the bit rate in the MAC CE as being an aggregate downlink bit rate and (2) a Bit-Rate field that includes a value that represents either a bit rate for the downlink radio bearer having the provided radio bearer ID or an aggregate downlink bit rate, depending on the value of the radio bearer ID in the MAC CE. Specifically, in this example, a value of 0 in the Bearer-ID field indicates that the bit rate is an aggregate downlink bit rate. Otherwise, the Bearer-ID field includes an ID of a downlink radio bearer, and the bit rate is a bit rate for that downlink radio bearer.

Conversely, if the LCID field of the MAC sub-header is set to 11001, then the MAC CE includes a Logical Channel-ID field that includes: (1) a logical channel ID that either identifies an uplink logical channel or identifies the bit rate in the MAC CE as an aggregate uplink bit rate and (2) a Bit-Rate field that includes a bit rate for the uplink logical channel identified by the logical channel ID or an aggregate uplink bit rate, depending on the value of the logical channel ID. Specifically, in this example, a value of 0 in the Logical Channel-ID field indicates that the bit rate is an aggregate uplink bit rate. Otherwise, the Logical Channel-ID field includes an ID of an uplink logical channel, and the bit rate is a bit rate for that uplink logical channel. For either the uplink case or the downlink case, in this example, the bit rate is a value in the range of 0 to 11, each corresponding to a different one of a predefined set of bit rate values (i.e., 8 kilobits per second (Kbps), 16, Kbps, etc.). In this example, the values of 12-15 are spare values.

FIG. 7 is a flow chart that illustrates the operation of the eNB 30 to transmit a bit rate to the UE 32 using the embodiment of FIG. 6. While described with respect to the eNB 30, this process may be performed by any suitable radio access node. As illustrated, the eNB 30 configures a MAC frame including a sub-header with either the LCID for downlink bit rate adaptation or the LCID value for uplink bit rate adaptation and a corresponding MAC CE including the bearer ID (e.g., the downlink radio bearer ID for the downlink case or the uplink logical channel ID for the uplink case) and the bit rate (step 500). The eNB 30 then transmits the MAC frame (step 502).

FIGS. 8A and 8B provide a flow chart that illustrates the operation of the UE 32 to receive a bit rate from the eNB 30 according to the embodiment of FIG. 6. While described with respect to the UE 32, the process may be performed by any suitable wireless device. This process is primarily performed at the MAC layer of the UE 32. As illustrated, the UE 32 receives a MAC frame (step 600), and extracts an LCID value from a sub-header within the MAC frame (step 602). The UE 32 then determines whether the LCID is the LCID value defined for downlink bit rate adaptation (step 604). If so, the UE 32 obtains the downlink radio bearer ID from the corresponding MAC CE (step 606). The UE 32 then determines whether the downlink radio bearer ID in the MAC CE indicates that the bit rate in the MAC CE is an aggregate downlink bit rate (step 608). If not, the UE 32 determines whether the downlink radio bearer ID in the MAC CE matches a downlink radio bearer of the UE 32 (step 610). If there is a match, the UE 32 obtains the bit rate for the downlink radio bearer from the MAC CE (step 612) and, in this embodiment, the MAC layer of the UE 32 notifies an upper layer(s) at the UE 32 (e.g., layer 4) (step 614). While not illustrated, as discussed above, the upper layer(s) may then notify the transmitting end-point of the bit rate.

Returning to step 608, if the downlink radio bearer ID in the MAC CE indicates that the bit rate in the MAC CE is an aggregate downlink bit rate, the UE 32 obtains the aggregate downlink bit rate from the MAC CE (i.e., interprets the bit rate in the MAC CE an as aggregate downlink bit rate) (step 616). In this embodiment, the UE 32 notifies the upper layer(s) of the aggregate downlink bit rate (step 618). While not illustrated, as discussed above, the upper layer(s) may then notify the transmitting end-point of the bit rate.

Returning to step 604, if the LCID in the sub-header is not the LCID defined for downlink rate adaptation, the UE 32 determines whether the LCID in the sub-header is the LCID defined for uplink rate adaptation (step 620). If so, the UE 32 obtains the uplink logical channel ID from the corresponding MAC CE (step 622). The UE 32 determines whether the uplink logical channel ID indicates that the bit rate in the MAC CE is an aggregate uplink bit rate (step 624). If not, the UE 32 determines whether the uplink logical channel ID from the MAC CE matches an ID of an uplink logical channel of the UE 32 (step 626). If so, the UE 32 obtains the bit rate for the uplink logical channel from the MAC CE (step 628). In this embodiment, the MAC layer of the UE 32 notifies an upper layer(s) of the bit rate (step 630). While not illustrated, the UE 32 then begins transmitting on the logical channel using the provided bit rate. More specifically, in one embodiment, the MAC layer passes the bit rate to the MAC scheduler, which then uses the bit rate to update or replace the PBR value associated with the uplink logical channel. The PBR is used by the MAC scheduler, as defined by 3GPP.

Returning to step 624, if the uplink logical channel ID in the MAC CE indicates that the bit rate in the MAC CE is an aggregate uplink bit rate, the UE 32 obtains the aggregate uplink bit rate from the MAC CE (step 632). The aggregate uplink bit rate can then be used by the UE 32 to adjust the aggregate bit rate of all uplink logical channels of the UE 32, including the uplink bit rate of the logical channel in the end-to-end communication path, based on the aggregate uplink bit rate from the MAC CE. In this embodiment, the MAC layer of the UE 32 notifies upper layer(s) of the new aggregate uplink bit rate (step 634). Lastly, returning to steps 610, 620, and 626, if the answer to any of those decisions is "no," then the UE 32 determines whether there are any more sub-headers to process in the MAC subframe (step 636). If so, the process returns to step 602 and is repeated. In this example, once all of the MAC sub-headers have been processed, the process ends.

FIG. 9 illustrates encoding of bit rate adaptation information to a MAC sub-header and corresponding MAC CE within the MAC frame structure of FIG. 5 according to another embodiment of the present disclosure. As illustrated, the MAC sub-header is 1 octet, or 2 octets if length is added. The MAC sub-header includes reserved fields (R), an extended field (E), and an LCID field. In this embodiment, the LCID field is set to the LCID 11001 or some other predefined LCID defined for bit rate adaption to indicate that either a downlink bit rate or an uplink bit rate is transmitted in the corresponding MAC CE. The MAC CE is also 1 octet. The MAC CE includes a Bearer-ID field that includes either an uplink Logical Channel Group (LCG) ID or a downlink radio bearer ID depending on whether the bit rate in the MAC CE is for uplink logical channel(s) in an uplink logical channel group or a downlink radio bearer. In this particular example, the Bearer-ID field includes a value in the range of 0 to 15, where values 0, 1, 2, and 3 correspond to LCG IDs and values 4-15 correspond to downlink radio bearer IDs. The Bit-Rate field in the MAC CE includes a value that represents a bit rate for the identified uplink LCG or downlink radio bearer. For either the uplink case or the downlink case, in this example, the bit rate is a value in the range of 0 to 11, each corresponding to a different one of a predefined set of bit rate values (i.e., 8 Kbps, 16, Kbps, etc.). In this example, the values of 12-15 are spare values.

FIG. 10 is a flow chart that illustrates the operation of the eNB 30 to transmit a bit rate to the UE 32 using the embodiment of FIG. 9. While described with respect to the eNB 30, this process may be performed by any suitable radio access node. As illustrated, the eNB 30 configures a MAC frame including a sub-header with the LCID for bit rate adaptation and a corresponding MAC CE including either the uplink LCG ID or the downlink radio bearer ID and the bit rate (step 700). The eNB 30 then transmits the MAC frame (step 702).

FIGS. 11A and 11B provide a flow chart that illustrates the operation of the UE 32 to receive a bit rate from the eNB 30 according to the embodiment of FIG. 9. While described with respect to the UE 32, the process may be performed by any suitable wireless device. This process is primarily performed at the MAC layer of the UE 32. As illustrated, the UE 32 receives a MAC frame (step 800), and extracts an LCID value from a sub-header within the MAC frame (step 802). The UE 32 then determines whether the LCID is the LCID value defined for bit rate adaptation (step 804). If so, the UE 32 obtains the radio bearer ID from the corresponding MAC CE (step 806) and determines whether the radio bearer ID in the MAC CE indicates that the radio bearer ID in the MAC CE is an LCID downlink radio bearer ID (step 808). If the radio bearer ID is an LCID downlink radio bearer, the UE 32 determines whether the radio bearer ID matches an ID of a downlink radio bearer of the UE 32 (step 810). If there is a match, the UE 32 obtains the bit rate for the downlink radio bearer from the MAC CE (step 812) and, in this embodiment, the MAC layer of the UE 32 notifies an upper layer(s) at the UE 32 (e.g., layer 4) (step 814). While not illustrated, as discussed above, the upper layer(s) may then notify the transmitting end-point of the bit rate.

Returning to step 808, if the radio bearer ID in the MAC CE is not an LCID downlink radio bearer ID, the radio bearer ID in the MAC CE is an uplink LCG ID. As such, the UE 32 determines whether the uplink LCG ID from the MAC CE matches a LCG ID of an uplink logical channel of the UE 32 (step 816). If so, the UE 32 obtains the bit rate for the uplink LCG from the MAC CE (step 818). In this embodiment, the MAC layer of the UE 32 notifies an upper layer(s) of the bit rate (step 820). While not illustrated, UE 32 then begins transmitting on the uplink logical channel using the provided bit rate for the corresponding uplink LCG. Lastly, returning to steps 804, 810, and 816, if the answer to any of those decisions is "no," then the UE 32 determines whether there are any more sub-headers to process in the MAC subframe (step 822). If so, the process returns to step 802 and is repeated. In this example, once all of the MAC sub-headers have been processed, the process ends.

FIG. 12 illustrates encoding of bit rate adaptation information to a MAC sub-header and corresponding MAC CE within the MAC frame structure of FIG. 5 according to another embodiment of the present disclosure. In this embodiment, both a downlink bit rate and an uplink bit rate are provided in a single MAC CE. Notably, the downlink bearer and uplink logical channel are associated at creation time. As illustrated, the MAC sub-header is 2 octets (i.e., the Length field is set to 2). The MAC sub-header includes reserved fields (R), an extended field (E), an LCID field, a field (F) set to 0, and the Length field (L) set to 2. In this embodiment, the LCID field is set to the LCID 11011 to indicate that both uplink or downlink bit rate adaption information is provided in the corresponding MAC CE. The MAC CE is also 2 octets. The MAC CE includes a direction field (D) that is set to 0 for downlink or 1 for uplink. As illustrated, if the direction field (D) is set to 0 for the downlink, then the MAC CE also includes a Bearer-ID field, an uplink (UL) rate field for an uplink bit rate, and a downlink (DL) rate field for a downlink bit rate. In this example, the Bearer-ID field is set to 0 if the downlink bit rate applies to the aggregate downlink bit rate or set to a value of 1 to 15 if the bit rate applies to a particular downlink radio bearer having the corresponding radio bearer ID. Conversely, if the direction field (D) is set to 1 for the uplink, then the MAC CE includes a logical channel ID field (LogChannel-ID), an uplink (UL) rate field for an uplink bit rate, and a downlink (DL) bit rate field for a downlink bit rate. In this example, the logical channel ID field is set to 0 if the uplink bit rate applies to the aggregate uplink bit rate or set to a value in the range of 1 to 15 if the uplink bit rate applies to a particular uplink logical channel having the corresponding uplink logical channel ID. For either the uplink case or the downlink case, in this example, the bit rate is a value in the range of 0 to 11, each corresponding to a different one of a predefined set of bit rate values (i.e., 8 Kbps, 16, Kbps, etc.). In this example, the values of 12-15 are spare values or other values to be determined for the particular implementation.

FIG. 13 is a flow chart that illustrates the operation of the eNB 30 to transmit both downlink and uplink bit rates to the UE 32 using the embodiment of FIG. 12. While described with respect to the eNB 30, this process may be performed by any suitable radio access node. As illustrated, the eNB 30 configures a MAC frame including a sub-header with the LCID for bit rate adaptation and a corresponding MAC CE including both a bit rate for the downlink and a bit rate for the uplink (step 900). The eNB 30 then transmits the MAC frame (step 902).

FIGS. 14A and 14B provide a flow chart that illustrates the operation of the UE 32 to receive both downlink and uplink bit rates from the eNB 30 according to the embodiment of FIG. 12. While described with respect to the UE 32, the process may be performed by any suitable wireless device. This process is primarily performed at the MAC layer of the UE 32. As illustrated, the UE 32 receives a MAC frame (step 1000) and extracts an LCID value from a sub-header within the MAC frame (step 1002). The UE 32 then determines whether the LCID is the LCID value defined for bit rate adaptation (step 1004). If so, the UE 32 determines whether the MAC CE is configured for the downlink (e.g., D=0) or for the uplink (e.g., D=1) (step 1006). If the MAC CE is configured for the downlink, the UE 32 obtains the downlink radio bearer ID from the MAC CE (step 1008) and determines whether the downlink radio bearer ID is an ID defined to indicate an aggregate downlink bit rate (step 1010). If the downlink radio bearer ID does not indicate an aggregate downlink bit rate, the UE 32 determines whether the downlink radio bearer ID matches a downlink radio bearer of the UE 32 (step 1012). If there is a match, the UE 32 obtains the bit rate for the downlink radio bearer and the bit rate for an associated uplink logical channel from the MAC CE (step 1014). In this embodiment, the MAC layer of the UE 32 notifies an upper layer(s) at the UE 32 (e.g., layer 4) of the downlink and uplink bit rates (step 1016). While not illustrated, as discussed above, the upper layer(s) may then notify the transmitting end-point of the bit rates.

Returning to step 1010, if the downlink radio bearer ID in the MAC CE indicates an aggregate bit rate, the UE 32 obtains the downlink bit rate from the MAC CE and interprets the downlink bit rate from the MAC CE as an aggregate downlink bit rate for the UE 32 (step 1018). In step 1018, the UE 32 also obtains the uplink bit rate from the MAC CE and interprets the uplink bit rate as an aggregate uplink bit rate for the UE 32. In this embodiment, the MAC layer of the UE 32 notifies an upper layer(s) at the UE 32 of the aggregate downlink bit rate and the aggregate uplink bit rate (step 1020).

Returning to step 1006, if the MAC CE is configured for the uplink, the UE 32 obtains the uplink logical channel ID from the corresponding MAC CE (step 1022). The UE 32 determines whether the uplink logical channel ID from the MAC CE is a value that indicates an aggregate uplink bit rate (step 1024). If not, the UE 32 determines whether the uplink logical channel ID from the MAC CE matches an ID of an uplink logical channel of the UE 32 (step 1026). If so, the UE 32 obtains the bit rate for the uplink logical channel and the bit rate for an associated downlink radio bearer from the MAC CE (step 1028). In this embodiment, the MAC layer of the UE 32 notifies an upper layer(s) of the bit rates (step 1030). Returning to step 1024, if the uplink logical channel ID in the MAC CE indicates an aggregate bit rate, the UE 32 obtains the uplink bit rate from the MAC CE and interprets the uplink bit rate from the MAC CE as an aggregate uplink bit rate for the UE 32 (step 1032). In step 1032, the UE 32 also obtains the downlink bit rate from the MAC CE and interprets the downlink bit rate as an aggregate downlink bit rate for the UE 32. Note that the meaning of "aggregated downlink bit rate" and "aggregated uplink bit rate" is the same as the UE Aggregated Maximum Bitrate (UE-AMBR) for downlink and for uplink and defined in 3GPP TS 23.401 V12.5.0. In this embodiment, the MAC layer of the UE 32 notifies an upper layer(s) at the UE 32 of the aggregate downlink bit rate and the aggregate uplink bit rate (step 1034).

Returning to steps 1004, 1012, and 1026, if the answer to any of those decisions is "no," then the UE 32 determines whether there are any more sub-headers to process in the MAC subframe (step 1036). If so, the process returns to step 1002 and is repeated. In this example, once all of the MAC sub-headers have been processed, the process ends.

In the embodiments of FIGS. 4 to 14A and 14B, bit rate adaptation is performed at the MAC layer. However, the present disclosure is not limited thereto. In this regard, FIGS. 15A through 15C illustrate direct rate adaptation processes for a downlink radio bearer and/or an uplink logical channel that utilize Radio Resource Control (RRC) signaling according to various embodiments of the present disclosure. More specifically, FIG. 15A illustrates a direct rate adaptation process for a downlink radio bearer that utilizes RRC signaling according to one embodiment of the present disclosure. In this embodiment, the communication path from the transmitting end-point of the end-to-end communication path to the UE 32 includes a downlink radio bearer between the eNB 30 and the UE 32. At some point, the eNB 30 decides or otherwise determines that the bit rate of the downlink radio bearer, and thus the bit rate of the end-to-end communication path, is to be changed. For example, the eNB 30 may detect or be notified of a congestion level in the LTE network 22 such as, e.g., a congestion level in the cell served by the eNB 30 and to which the UE 32 is connected. The eNB 30 then selects a new bit rate associated with the downlink radio bearer (step 1100). While the manner in which the new bit rate is selected is outside of the scope of the present disclosure, in one embodiment, the eNB 30 selects the new bit rate based on the congestion level in the LTE network 22 (e.g., the congestion level in the cell served by the eNB 30 and to which the UE 32 is connected). For example, the new bit rate may be inversely related to the congestion level.

Once the new bit rate is selected, the eNB 30 sends, or transmits, the new bit rate to the UE 32 via RRC signaling (step 1102). In this manner, the eNB 30 directly sets the bit rate associated with the downlink radio bearer and thereby controls the bit rate for the end-to-end communication path. The eNB 30 may transmit the new bit rate by transmitting a value that is, e.g., a binary value corresponding to the new bit rate or bit pattern that is mapped to a desired bit rate in a predefined set of bit rates. As discussed below, in one embodiment, the eNB 30 transmits the new bit rate in an RRC Connection Reconfiguration message which may contain one or more Information Elements (IEs). In particular, a special IE, denoted herein as DownlinkBearerConfig IE, may be included in the RRC connection Reconfiguration message. Further, in some embodiments, the new bit rate can be transmitted for either a Guaranteed Bit Rate (GBR) downlink radio bearer or a non-GBR downlink radio bearer.

At the UE 32, the UE 32 receives the new bit rate from the eNB 30 (step 1104). In response, the UE 32 notifies the transmitting end-point of the end-to-end communication path of the new bit rate (step 1106). While not illustrated, the transmitting end-point then adjusts the bit rate at which it is transmitting according to the new bit rate. Thus, in this manner, the eNB 30 has controlled the bit rate of the end-to-end communication path. Thereafter, the eNB 30 transmits the downlink to the UE 32 on the downlink radio bearer according to the new bit rate, and the UE 32 receives the downlink on the downlink radio bearer according to the new bit rate (steps 1108 and 1110). Notably, this process may be repeated as desired by the eNB 30 to dynamically adjust, or adapt, the bit rate to, e.g., the congestion level in the LTE network 22.

In the embodiment of FIG. 15B, the UE 32 is the transmitting end-point of the end-to-end communication path. As such, the communication path from the UE 32 to the receiving end-point of the end-to-end communication path includes an uplink logical channel (which may also be referred to as an uplink radio bearer) between the eNB 30 and the UE 32. At some point, the eNB 30 decides or otherwise determines that the bit rate of the uplink logical channel (or a corresponding uplink logical channel group), and thus the bit rate of the end-to-end communication path, is to be changed. For example, the eNB 30 may detect or be notified of a congestion level in the LTE network 22 such as, e.g., a congestion level in the cell served by the eNB 30 and to which the UE 32 is connected. The eNB 30 then selects a new bit rate associated with the uplink logical channel (step 1200). While the manner in which the new bit rate is selected is outside of the scope of the present disclosure, in one embodiment, the eNB 30 selects the new bit rate based on the congestion level in the LTE network 22 (e.g., the congestion level in the cell served by the eNB 30 and to which the UE 32 is connected). For example, the new bit rate may be inversely related to the congestion level.

Once the new bit rate is selected, the eNB 30 sends, or transmits, the new bit rate to the UE 32 via RRC signaling (step 1202). In this manner, the eNB 30 directly sets the bit rate associated with the uplink logical channel and thereby controls the bit rate for the end-to-end communication path. The eNB 30 may transmit the new bit rate by transmitting a value that is, e.g., a binary value corresponding to the new bit rate or bit pattern that is mapped to a desired bit rate in a predefined set of bit rates. As discussed below, in one embodiment, the eNB 30 transmits the new bit rate in an RRC Connection Reconfiguration message IE. Further, in some embodiments, the new bit rate can be transmitted for either a GBR uplink logical channel or a non-GBR uplink logical channel.

At the UE 32, the UE 32 receives the new bit rate associated with the uplink logical channel from the eNB 30 (step 1204). The UE 32 then operates according to the new bit rate. For example, in some embodiments, the UE 32 notifies the receiving end-point of the end-to-end communication path of the new bit rate (step 1206). Note, however, that step 1206 is optional. The UE 32 then transmits the uplink on the uplink logical channel according to the new bit rate (step 1208). While not illustrated, the eNB 30 then propagates the communication to the receiving end-point over the end-to-end communication path through the EPC network 26. In this manner, the eNB 30 has controlled the bit rate of the end-to-end communication path. More specifically, in some embodiments, the UE 32 uses the bit rate to update or replace the PBR value associated with the uplink logical channel. As defined by 3GPP, the PBR is used by a scheduler of the UE 32. Notably, this process may be repeated as desired by the eNB 30 to dynamically adjust, or adapt, the bit rate to, e.g., the congestion level in the LTE network 22.

FIG. 15C is similar to FIGS. 15A and 15B but where the eNB 30 controls both the bit rate associated with the downlink radio bearer and the bit rate associated with the uplink logical channel between the eNB 30 and the UE 32. More specifically, in FIG. 15C, there are two end-to-end communication paths between the UE 32 and the other end-point, one in each direction. As such, for one end-to-end communication path, the UE 32 is the receiving end-point of the end-to-end communication path and, therefore, the end-to-end communication path from the transmitting end-point to the UE 32 includes a downlink radio bearer between the eNB 30 and the UE 32. For the other end-to-end communication path, the UE 32 is the transmitting end-point and, therefore, the end-to-end communication path from the UE 32 to the receiving end-point includes an uplink logical channel between the eNB 30 and the UE 32.

At some point, the eNB 30 decides or otherwise determines that the bit rate associated with the downlink radio bearer and the bit rate associated with the uplink logical channel, and thus the bit rates of the end-to-end communication paths, is to be changed, as discussed above. The eNB 30 then selects a new bit rate associated with the downlink radio bearer and a new bit rate associated with the uplink logical channel, as discussed above (step 1300). Once the new bit rates are selected, the eNB 30 sends, or transmits, the new bit rates associated with the downlink radio bearer and the uplink logical channel to the UE 32 via RRC signaling (step 1302). In this manner, the eNB 30 directly sets the bit rates associated with the downlink radio bearer and the uplink logical channel and thereby controls the bit rates for the two end-to-end communication paths. As discussed above, the eNB 30 may transmit the new bit rates by transmitting values that are, e.g., binary values corresponding to the new bit rates or bit patterns that are mapped to the desired bit rates in a predefined set of bit rates.

Notably, in some embodiments, the uplink and downlink are asymmetrical in that adjusting one does not require adjusting the other. However, in other embodiments, a symmetrical connection is provided for the uplink and downlink directions where adjusting the bit rate of one requires adjusting the other. In one particular embodiment, the PBR parameter is used to change the bit rate for both the downlink radio bearer and the uplink logical channel for the connection.

At the UE 32, the UE 32 receives the new bit rates from the eNB 30 (step 1304). In response, the UE 32 notifies the other end-point of the end-to-end communication paths of the new bit rate (step 1306). While not illustrated, the other end-point then adjusts the bit rate at which it is transmitting/receiving according to the new bit rates. Thus, in this manner, the eNB 30 has controlled the bit rates of the end-to-end communication paths between the other end-point and the UE 32. Thereafter, the eNB 30 transmits the downlink to the UE 32 on the downlink radio bearer according to the new bit rate associated with the downlink radio bearer, and the UE 32 receives the downlink on the downlink radio bearer according to the new bit rate (steps 1308 and 1310). In addition, with respect to the end-to-end communication path from the UE 32 to the other end-point, the UE 32 transmits the uplink on the uplink logical channel according to the new bit rate associated with the uplink logical channel (step 1312). Notably, this process may be repeated as desired by the eNB 30 to dynamically adjust, or adapt, the bit rates to, e.g., the congestion level in the LTE network 22.

FIGS. 15A-15C generally discuss the use of RRC signaling to dynamically adapt bit rate(s). FIGS. 16-18 illustrate processes for dynamically adapting bit rate(s) using an RRC Connection Reconfiguration message during E-UTRAN Radio Access Bearer (E-RAB) establishment, E-RAB modification, or as desired by the eNB 30. Note, however, that the bit rate(s) may be dynamically adapted during initial context setup and/or during X2/S1 handover, where the bit rate for the downlink radio bearer can be communicated from the eNB to the UE. More specifically, FIG. 16 illustrates a process for dynamically adapting bit rate(s) using an RRC Connection Reconfiguration message for a new connection (i.e., during Initial Context setup, E-RAB setup or establishment) according to one embodiment of the present disclosure. As illustrated, in order to establish E-RAB for a new connection either to or from the UE 32, the S-GW 34 sends a Create Bearer Request to the MME 36 (step 1400). The MME 36 then sends an E-RAB Setup Request to the eNB 30 (step 1402). Notably, steps 1400 and 1402 are conventional steps, the details of which will be understood by one of ordinary skill in the art. While not essential, the interested reader is directed to 3GPP TS 36.413 V12.1.0. The eNB 30 then selects a bit rate for the radio bearer being established (step 1404). While the selection may use any suitable criteria, in one embodiment, the bit rate is selected based on a congestion level of the cell served by the eNB 30. Importantly, selection of the bit rate by the eNB 30 is beneficial in that this allows the eNB 30 to control the bit rate locally at the eNB 30 based on, e.g., congestion level. For example, when the congestion level is low or there is no congestion, the eNB 30 may select a maximum bit rate. Conversely, as the congestion level increases, the eNB 30 may decrease the bit rate. This is also applicable during S1/X2 handover, the bit rate may be selected based on congestion condition of the target cell and sent to UE through RRC Connection Reconfiguration message. Once the bit rate for the radio bearer is selected by the eNB 30, the eNB 30 sends an RRC Connection Reconfiguration message including the bit rate to the UE 32 (step 1406). Importantly, in one embodiment, the bit rate is selected and communicated to the UE 32 regardless of whether the radio bearer is a GBR bearer or a non-GBR bearer. In one embodiment, the radio bearer being established is an uplink logical channel, and the bit rate is a bit rate for a corresponding logical channel. The bit rate for the logical channel is then communicated to the UE 32 using the parameters in the LogicalChannelConfig IE, including a Prioritized Bit Rate (PBR) parameter, in the RRC Connection Reconfiguration message. The RRC Connection Reconfiguration message including the LogicalChannelConfig IE is defined in 3GPP TS 36.331 V12.1.0. In other words, the bit rate for the logical channel is communicated to the UE 32 using existing parameters as defined in 3GPP TS 36.331 V12.1.0, where the existing parameters are the parameters in the LogicalChannelConfig IE, including PBR. Other parameters in the LogicalChannelConfig IE may be Logical Channel Group (LCG) and Priority. For example, some versions of 3GPP TS 36.331 define logical channel configuration parameters as in the table below:

While bit rate adaptation for E-RAB establishment or modification via RRC signaling has been described above, the described mechanism is also applicable for other uses such as initial context setup and X2/S1 handover, where the bit rate for the downlink radio bearer can be communicated from the eNB to the UE. In these two cases, the uplink bit rate is not new in these cases, but the bit rate for downlink is new.

In another embodiment, the radio bearer being established is a downlink radio bearer, and the bit rate is the bit rate for the downlink radio bearer. In one embodiment, the bit rate for the downlink radio bearer is communicated to the UE 32 in a new (i.e., not currently standardized) IE for the RRC Connection Reconfiguration message, as discussed below. The new IE is denoted herein as DownlinkBearerConfig IE, however it will be recognized that other names can be equally used. However, in another embodiment, an existing IE for the RRC Connection Reconfiguration message is used to communicate the bit rate for the downlink radio bearer to the UE 32. For example, the LogicalChannelConfig IE may be modified to include a parameter that indicates whether the PBR parameter provides a bit rate for an uplink logical channel or a downlink radio bearer, or both. One example of the DownlinkBearerConfig IE is depicted below. The DownlinkBearerConfig IE may include a parameter that indicates

| Parameter | Description | Value |
| --- | --- | --- |
| Priority | Assigns a priority level to the logical channel. Smaller numeric values correspond to higher priority levels (i.e. 1 is the highest priority). | 1-16 |
| Prioritized Bit Rate (PBR) | Provides a "guaranteed" bit rate that should be achieved for the corresponding logical channel (provided that the eNB assigns sufficient uplink resources). | 0, 8, 16, 32, 64, 128, 256, Infinity (kB/s, kilobytes (1000 bytes) per second) |
| Bucket Size Duration | Used for resource allocation during logical channel prioritization by the UE on the uplink. | 50, 100, 150, 300, 500, 1000 (ms) |
| Logical Channel Group (LCG) | Optionally assigns this channel to a Logical Channel Group, which may also include other logical channels. LCGs are used when the UE generates BSRs (Buffer Status Reports). | |
| direction | New parameter to specify the direction to which this IE applies. (Note: this is for the option to reuse the IE for both direction) | Uplink, Downlink, Bi-direction | whether the PBR parameter provides a bit rate for uplink or downlink or bi-direction.

| IE/Group Name | Presence | Range | IE type and reference | Semantics description |
| --- | --- | --- | --- | --- |
| DownlinkBearer Config | | | | |
| PrioritizedBitRate | M | | Enumerated | This parameter identifies the bit rate that should be achieved for the corresponding radio bearer. |

| IE/Group Name | Presence | Range | IE type and reference | Semantics description |
|---|---|---|---|---|
| direction | O | | Enumerated (Uplink, Downlink, Bi-direction) | This parameter to specify the direction to which this IE applies. (Note: this is for the option to reuse the IE for both direction) |

From this point, the procedure continues in the conventional manner. Specifically, the UE 32 sends an RRC Connection Reconfiguration Complete message to the eNB 30 (step 1408). The eNB 30 then sends an E-RAB Setup Response to the MME 36 (step 1410). Lastly, the MME 36 sends a Create Bearer Response to the S-GW 34 (step 1412). At this point, the radio bearer is established with the bit rate selected by the eNB 30.

FIG. 17 illustrates a process for dynamically adapting bit rate(s) using an RRC Connection Reconfiguration message for modifying an existing connection (i.e., during an E-RAB modify procedure) according to one embodiment of the present disclosure. As illustrated, in order to modify an E-RAB for an existing connection either to or from the UE 32, the S-GW 34 sends an Update Bearer Request to the MME 36 (step 1500). The MME 36 then sends an E-RAB Modify Request to the eNB 30 (step 1502). Notably, steps 1500 and 1502 are conventional steps, the details of which will be understood by one of ordinary skill in the art. While not essential, the interested reader is directed to 3GPP TS 36.413 V12.1.0. The eNB 30 then selects a bit rate for the radio bearer being modified (step 1504). While the selection may use any suitable criteria, in one embodiment, the bit rate is selected based on a congestion level of the cell served by the eNB 30. Importantly, selection of the bit rate by the eNB 30 is beneficial in that this allows the eNB 30 to control the bit rate locally at the eNB 30 based on, e.g., congestion level. For example, when the congestion level is low or there is no congestion, the eNB 30 may select a maximum bit rate. Conversely, as the congestion level increases, the eNB 30 may decrease the bit rate.

Once the bit rate for the radio bearer is selected by the eNB 30, the eNB 30 sends an RRC Connection Reconfiguration message including the bit rate to the UE 32 (step 1506). Importantly, in one embodiment, the bit rate is selected and communicated to the UE 32 regardless of whether the radio bearer is a GBR bearer or a non-GBR bearer. In one embodiment, the radio bearer being modified is an uplink logical channel, and the bit rate is a bit rate for a corresponding logical channel. The bit rate for the logical channel is then communicated to the UE 32 using one or more parameters in the LogicalChannelConfig IE in the RRC Connection Reconfiguration message. In particular, the PBR parameter may be used. The RRC Connection Reconfiguration message including the LogicalChannelConfig IE is defined in 3GPP TS 36.331 V12.1.0. In other words, the bit rate for the logical channel group is communicated to the UE 32 using existing parameters as defined in 3GPP TS 36.331 V12.1.0, where the existing parameters are the parameters in the LogicalChannelConfig IE, including PBR.

In another embodiment, the radio bearer being modified is a downlink radio bearer, and the bit rate is the bit rate for the downlink radio bearer. In one embodiment, the bit rate for the downlink radio bearer is communicated to the UE 32 in a new IE for the RRC Connection Reconfiguration message, as discussed below. However, in another embodiment, an existing IE for the RRC Connection Reconfiguration message is used to communicate the bit rate for the downlink radio bearer to the UE 32. For example, the LogicalChannelConfig IE may be modified to include a flag that indicates whether the PBR parameters provide a bit rate for an uplink logical channel or a downlink radio bearer.

From this point, the procedure continues in the conventional manner. Specifically, the UE 32 sends an RRC Connection Reconfiguration Complete message to the eNB 30 (step 1508). The eNB 30 then sends an E-RAB Modify Response to the MME 36 (step 1510). Lastly, the MME 36 sends an Update Bearer Response to the S-GW 34 (step 1512). At this point, the radio bearer is modified with the bit rate selected by the eNB 30.

FIG. 18 illustrates a process for dynamically adapting bit rate(s) using an RRC Connection Reconfiguration message according to another embodiment of the present disclosure. In this embodiment, rather than selecting the bit rate as part of an E-RAB establishment or modify procedure, the eNB 30 monitors a congestion level of the cell (e.g., congestion level of radio resources of the cell or other resources, e.g., processing resources, of the eNB 30) Note, however, that congestion is not limited to the cell level. Rather, congestion may be detected for the particular UE 30 (e.g., upon the occurrence of a large delay). As illustrated, the eNB 30 detects the congestion level of the cell (step 1600). Then for one or more connections impacted by the congestion level, the eNB 30 selects a bit rate associated with a radio bearer of the UE 32 for the connection based on the congestion level (step 1602). The radio bearer may be either a downlink radio bearer of the UE 32 or an uplink logical channel of the UE 32. The eNB 30 then sends an RRC Connection Reconfiguration message with the bit rate to the UE 32, as discussed above (step 1604). The UE 32 then responds with an RRC Connection Reconfiguration Complete message (step 1606). The eNB 30 repeats this process periodically or as otherwise desired to dynamically adapt, or update, the bit rate for the radio bearer of the UE 32 according to, in this example, the congestion level of the cell.

As discussed above with respect to FIGS. 16-18, the eNB 30 can signal a bit rate to the UE 32 in an RRC Connection Reconfiguration message sent, e.g., when the corresponding radio bearer is established or modified. In one embodiment, the radio bearer is an uplink radio bearer and, as discussed above, the bit rate is configured and reconfigured using the PBR parameter in the LogicalChannelConfig IE in the RRC Connection Reconfiguration message. In one embodiment, the eNB 30 uses the PBR parameter to signal a bit rate for the UE 32 for an uplink logical channel.

In the case when a connection is symmetrical for both uplink and downlink directions, in one embodiment, the same PBR parameters are used to change the bit rate both the downlink radio bearer and the uplink logical channel for the connection. In the case when a connection is asymmetrical and the eNB 30 has selected the connection for bit rate adaptation, the new bit rate to use for the uplink logical channel is signaled to the UE 32 using the PBR parameters, while a new IE in the RRC Connection Reconfiguration is used to signal the bit rate to use by the UE 32 for the downlink radio bearer.

FIG. 19 illustrates one example of a new IE for the RRC Connection Reconfiguration message that is used for downlink bit rate adaptation according to one embodiment of the present disclosure. The new IE is referred to herein as DownlinkBearerConfig and can be used to configure and reconfigure the downlink bit rate. When the UE 32 receives DownlinkBearerConfig from the eNB 30, then, for each DRB-Identity in the DRB-ToAddMod list, the UE 30 can, in some embodiments, pass the bit rate to upper layer(s) to do downlink bit rate adaptation.

FIG. 20 is a block diagram of the eNB 30 of FIG. 2 according to one embodiment of the present disclosure. Note, however, that this description is more generally applicable to any radio access node. As illustrated, the eNB 30 includes a baseband unit 42 including a processor 44, memory 46, and a network interface 48, and a radio unit 50 including a wireless transceiver 52 coupled to one or more antennas 54. In general, the eNB 30 operates according to any of the embodiments described above. In one embodiment, the functionality of the eNB 30 discussed above is implemented in software stored in the memory 46 that is executable by the processor 44 whereby the eNB 30 operates according to any of the embodiments described above.

FIG. 21 is a block diagram of the eNB 30 of FIG. 2 according to another embodiment of the present disclosure. Again, note that this description is more generally applicable to any radio access node. As illustrated, the eNB 30 includes a bit rate selection module 56 and a bit rate transmission module 58, each of which is implemented in software that is executable by a processor to cause the eNB 30 to operate according to any of the embodiments described above. In general, the bit rate selection module 56 operates to select a bit rate associated with a downlink radio bearer and/or a bit rate associated with an uplink logical channel between the eNB 30 and a wireless device, e.g., the UE 32. The bit rate transmission module 58 then operates to transmit the bit rate to the wireless device, as described above.

In one embodiment, a computer program including instructions which, when executed by at least one processor, causes the at least one processor to carry out the functionality of the eNB 30 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 46).

FIG. 22 is a block diagram of the UE 32 of FIG. 2 according to one embodiment of the present disclosure. Note, however, that this description is more generally applicable to any wireless device. As illustrated, the UE 32 includes a processor 60, memory 62, and a wireless transceiver 64 coupled to one or more antennas 66. In general, the UE 32 operates according to any of the embodiments described above. In one embodiment, the functionality of the UE 32 discussed above is implemented in software stored in the memory 62 that is executable by the processor 60 whereby the UE 32 operates according to any of the embodiments described above.

FIG. 23 is a block diagram of the UE 32 of FIG. 2 according to another embodiment of the present disclosure. Again, note that this description is more generally applicable to any wireless device. As illustrated, the UE 32 includes a bit rate reception module 68 and a bit rate processing module 70, each of which is implemented in software that is executable by a processor to cause the UE 32 to operate according to any of the embodiments described above. In general, the bit rate reception module 68 operates to receive a bit rate from a radio access node, e.g., the eNB 30. The bit rate processing module 70 then operates to, e.g., notify an upper layer(s) of the bit rate, notify the other end-point of the bit rate, and/or enable transmission or reception according to the bit rate.

In one embodiment, a computer program including instructions which, when executed by at least one processor, causes the at least one processor to carry out the functionality of the UE 32 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 62).

The following acronyms are used throughout this disclosure.

3GPP $3^{rd}$ Generation Partnership Project
CE Control Element
ECN Explicit Congestion Notification
eNB Enhanced or Evolved Node B
EPC Evolved Packet Core
E-RAB Evolved Universal Terrestrial Radio Access Network Radio Access Bearer
E-UTRAN Evolved Universal Terrestrial Radio Access Network
GBR Guaranteed Bit Rate
ID Identifier
IE Information Element
IP Internet Protocol
Kbps Kilobits per Second
LCG Logical Channel Group
LCID Logical Channel Identifier
LTE Long Term Evolution
MAC Medium Access Control
PBR Prioritized Bit Rate
PCRF Policy Charging and Rules Function
PDN Packet Data Network
P-GW Packet Data Network Gateway
QoS Quality of Service
RRC Radio Resource Control
RRU Remote Radio Unit
RTP Real-Time Transport Protocol
S-GW Serving Gateway
TCP Transmission Control Protocol
TS Technical Specification
TX Transmit
UE User Equipment
UE-AMBR User Equipment Aggregated Maximum Bitrate Those skilled in the art will recognize improvements and modifications to the embodiments of the present disclosure. All such improvements and modifications are considered within the scope of the concepts disclosed herein and the claims that follow.

What is claimed is:

1. A method of operation of a wireless device in a cellular communications network, the method comprising:
receiving, from a radio access node of the cellular communications network, a bit rate associated with a radio bearer between the radio access node and the wireless device, the radio bearer between the radio access node and the wireless device being part of an end-to-end communication path between the wireless device, as a first end-point for the end-to-end communication path, and a second end-point for the end-to-end communication path, wherein receiving the bit rate associated with the radio bearer between the radio access node and the wireless device comprises receiving a Medium Access Control (MAC) frame from the radio access node, the MAC frame comprising:

a MAC sub-header comprising a Logical Channel Identifier (LCID) that indicates that a corresponding MAC Control Element (CE) contains bit rate adaptation information; and the corresponding MAC CE comprising a value indicative of the bit rate associated with the radio bearer between the radio access node and the wireless device; and operating according to the bit rate.

2. The method of claim 1, wherein the LCID is an unused LCID as defined by a corresponding communications standard.

3. The method of claim 1, wherein the radio bearer, between the radio access node and the wireless device, is a downlink radio bearer, and receiving the MAC frame comprises:

determining that the LCID in the MAC sub-header is an LCID value that indicates that the corresponding MAC CE contains bit rate adaptation information for the downlink radio bearer;

determining that the corresponding MAC CE includes an identifier for the downlink radio bearer between the radio access node and the wireless device; and in response to determining that the LCID in the MAC sub-header is the LCID value that indicates that the corresponding MAC CE contains the bit rate adaptation information for the downlink radio bearer and determining that the corresponding MAC CE includes the identifier for the downlink radio bearer between the radio access node and the wireless device, obtaining the bit rate for the downlink radio bearer from the MAC CE.

4. The method of claim 1, wherein the radio bearer, between the radio access node and the wireless device, is an uplink logical channel, and receiving the MAC frame comprises:

determining that the LCID in the MAC sub-header is an LCID value that indicates that the corresponding MAC CE contains bit rate adaptation information for the uplink logical channel;

determining that the corresponding MAC CE includes an identifier for the uplink logical channel between the radio access node and the wireless device; and in response to determining that the LCID in the MAC sub-header is the LCID value that indicates that the corresponding MAC CE contains the bit rate adaptation information for the uplink logical channel and determining that the corresponding MAC CE includes the identifier for the uplink logical channel between the radio access node and the wireless device, obtaining the bit rate for the uplink logical channel from the MAC CE.

5. The method of claim 1, wherein the radio bearer, between the radio access node and the wireless device, is a downlink radio bearer, and receiving the MAC frame comprises:

determining that the LCID in the MAC sub-header is an LCID value that indicates that the corresponding MAC CE contains bit rate adaptation information;

determining that the corresponding MAC CE includes an identifier for the downlink radio bearer between the radio access node and the wireless device; and in response to determining that the LCID in the MAC sub-header is the LCID value that indicates that the corresponding MAC CE contains the bit rate adaptation information and determining that the corresponding MAC CE includes the identifier for the downlink radio bearer between the radio access node and the wireless device, obtaining the bit rate for the downlink radio bearer between the radio access node and the wireless device from the MAC CE.

6. The method of claim 1, wherein the radio bearer, between the radio access node and the wireless device, is an uplink logical channel, and receiving the MAC frame comprises:

determining that the LCID in the MAC sub-header is an LCID value that indicates that the corresponding MAC CE contains bit rate adaptation information;

determining that the corresponding MAC CE includes an identifier for a logical channel group identifier of the uplink logical channel between the radio access node and the wireless device; and in response to determining that the LCID in the MAC sub-header is the LCID value that indicates that the corresponding MAC CE contains the bit rate adaptation information and determining that the corresponding MAC CE includes the identifier for the logical channel group identifier of the uplink logical channel between the radio access node and the wireless device, obtaining the bit rate for the uplink logical channel from the MAC CE.

7. The method of claim 1, wherein receiving the MAC frame comprises:

determining that the LCID in the MAC sub-header is a value that indicates that the corresponding MAC CE contains the bit rate adaptation information; and in response to determining that the LCID in the MAC sub-header is the value that indicates that the corresponding MAC CE contains the bit rate adaptation information, obtaining both a bit rate associated with a downlink radio bearer and a bit rate associated with an uplink logical channel from the MAC CE, the radio bearer between the radio access node and the wireless device being one of the downlink radio bearer and the uplink logical channel.

8. The method of claim 1, wherein the value, indicative of the bit rate associated with the radio bearer between the radio access node and the wireless device, is one of a plurality of different values mapped to a plurality of different bit rates.

9. The method of claim 1, wherein receiving the bit rate, associated with the radio bearer between the radio access node and the wireless device, from the radio access node comprises receiving the bit rate, associated with the radio bearer between the radio access node and the wireless device, from the radio access node via Radio Resource Control (RRC) signaling.

10. The method of claim 9, wherein receiving the bit rate, associated with the radio bearer between the radio access node and the wireless device, from the radio access node via the RRC signaling comprises receiving an RRC Connection Reconfiguration message including an Information Element (IE) that includes the bit rate.

11. The method of claim 10, wherein the radio bearer, between the radio access node and the wireless device, is an uplink logical channel, the bit rate is a bit rate for a logical channel, the IE is a LogicalChannelConfig IE including one or more parameters including Prioritized Bit Rate (PBR), and receiving the RRC Connection Reconfiguration message including the IE that includes the bit rate comprises:
receiving the bit rate for the logical channel using the one or more parameters in the LogicalChannelConfig IE.

12. The method of claim 10, wherein the radio bearer, between the radio access node and the wireless device, is a downlink radio bearer, the bit rate is a bit rate for the downlink radio bearer, the IE is an IE for downlink bit rate adaptation, and receiving the RRC Connection Reconfiguration message including the IE that includes the bit rate comprises:
receiving the bit rate for the downlink radio bearer in the IE for the downlink bit rate adaptation.

13. The method of claim 1, wherein the cellular communications network is a Long Term Evolution (LTE) network.

14. The method of claim 13, wherein the radio access node is an enhanced Node B.

15. A wireless device configured to operate in a cellular communications network, the wireless device comprising:
a wireless transceiver;
a processor; and
a memory containing instructions executable by the processor, wherein the wireless device is operative to:
receive, from a radio access node of the cellular communications network via the wireless transceiver, a bit rate associated with a radio bearer between the radio access node and the wireless device, the radio bearer between the radio access node and the wireless device being a part of an end-to-end communication path between the wireless device, as a first end-point for the end-to-end communication path, and a second end-point for the end-to-end communication path, wherein, in order to receive the bit rate associated with the radio bearer between the radio access node and the wireless device, the wireless device is further operative to receive a Medium Access Control (MAC) frame from the radio access node, the MAC frame comprising:
a MAC sub-header comprising a Logical Channel Identifier (LCID) that indicates that a corresponding MAC Control Element (CE) contains bit rate adaptation information; and
the corresponding MAC CE comprising a value indicative of the bit rate associated with the radio bearer between the radio access node and the wireless device; and
operate according to the bit rate.

16. The wireless device of claim 15, wherein the LCID is an unused LCID as defined by a corresponding communications standard.

17. The wireless device of claim 15, wherein, in order to receive the bit rate, the wireless device is operative to, via execution of the instructions by the processor:
receive the bit rate, associated with the radio bearer between the radio access node and the wireless device, from the radio access node via Radio Resource Control (RRC) signaling.

18. The wireless device of claim 17, wherein, in order to receive the bit rate, associated with the radio bearer between the radio access node and the wireless device, from the radio access node via the RRC signaling, the wireless device is operative to, via execution of the instructions by the processor:
receive an RRC Connection Reconfiguration message including an Information Element (IE) that includes the bit rate.

19. The wireless device of claim 18, wherein:
the radio bearer, between the radio access node and the wireless device, is an uplink logical channel;
the bit rate is a bit rate for a logical channel;
the IE is a LogicalChannelConfig iE including one or more parameters including Prioritized Bit Rate (PBR); and
in order to receive the RRC Connection Reconfiguration message including the IE that includes the bit rate, the wireless device is operative to, via execution of the instructions by the processor, receive the bit rate for the logical channel via the one or more parameters in the LogicalChannelConfig IE.

20. The wireless device of claim 18, wherein:
the radio bearer, between the radio access node and the wireless device, is a downlink radio bearer;
the bit rate is a bit rate for the downlink radio bearer;
the IE is an IE for downlink bit rate adaptation; and
in order to receive the RRC Connection Reconfiguration message including the IE that includes the bit rate, the wireless device is operative to, via execution of the instructions by the processor, receive the bit rate for the downlink radio bearer in the IE for the downlink bit rate adaptation.

21. The wireless device of claim 15, wherein the cellular communications network is a Long Term Evolution (LTE) network.

* * * * *